(12) United States Patent
van Rooyen

(10) Patent No.: US 7,653,415 B2
(45) Date of Patent: Jan. 26, 2010

(54) METHOD AND SYSTEM FOR INCREASING DATA RATE IN A MOBILE TERMINAL USING SPATIAL MULTIPLEXING FOR DVB-H COMMUNICATION

(75) Inventor: Pieter van Rooyen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 504 days.

(21) Appl. No.: 11/237,329

(22) Filed: Sep. 28, 2005

(65) Prior Publication Data

US 2007/0071121 A1 Mar. 29, 2007

Related U.S. Application Data

(63) Continuation-in-part of application No. 10/645,349, filed on Aug. 21, 2003, now Pat. No. 7,148,845.

(60) Provisional application No. 60/405,285, filed on Aug. 21, 2002.

(51) Int. Cl.
*H04M 1/00* (2006.01)
(52) U.S. Cl. .............. 455/562.1; 455/333; 375/260; 370/321
(58) Field of Classification Search .......... 455/101, 455/103, 132, 323, 333, 334, 561, 562.1; 375/329, 332, 260; 370/315–321
See application file for complete search history.

(56) References Cited

U.S. PATENT DOCUMENTS

| | | | |
|---|---|---|---|
| 6,771,976 B1 * | 8/2004 | Koyama | 455/502 |
| 7,382,836 B2 * | 6/2008 | Okanobu | 375/316 |
| 2001/0053143 A1 * | 12/2001 | Li et al. | 370/344 |
| 2004/0104844 A1 * | 6/2004 | Rooyen et al. | 342/377 |
| 2005/0195734 A1 * | 9/2005 | Sandell et al. | 370/208 |
| 2006/0023745 A1 * | 2/2006 | Koo et al. | 370/468 |
| 2007/0060073 A1 * | 3/2007 | Boer et al. | 455/101 |

* cited by examiner

*Primary Examiner*—Nhan T Le
(74) *Attorney, Agent, or Firm*—McAndrews, Held & Malloy, Ltd.

(57) ABSTRACT

A method and system for increasing data rate in a mobile terminal using spatial multiplexing for digital video broadcasting for handhelds (DVB-H) communication are provided. A reconfigurable orthogonal frequency division multiplexing (OFDM) chip may be utilized in a mobile terminal to process received spatially multiplexed signals. The mobile terminal may be utilized in a spatially multiplexed multiple-input-multiple-output (SM-MIMO) wireless system. The spatially multiplexed signals may be quadrature phase shift keying (QPSK) modulated and may utilize OFDM subcarries. A processor may be utilized to configure the OFDM chip to process signals such as IEEE 802.11 and 802.16, and DVB. The OFDM chip may generate channel weights to be applied to the spatially multiplexed signals received in multiple receive antennas. The weighted signals may be combined to generate multiple RF received signals from which channel estimates may be generated. Subsequent channel weights may be dynamically generated from generated channel estimates.

14 Claims, 10 Drawing Sheets

METHOD AND SYSTEM FOR INCREASING DATA RATE IN A MOBILE TERMINAL USING SPATIAL MULTIPLEXING FOR DVB-H COMMUNICATION

CROSS-REFERENCE TO RELATED APPLICATIONS/INCORPORATION BY REFERENCE

The present application is a continuation-in-part of application Ser. No. 10/645,349, filed on Aug. 21, 2003, which makes reference to. claims priority to and claims benefit from U.S. Provisional Patent Application Ser. No. 60/405,285 filed on Aug. 21, 2002.

This application makes reference to: U.S. application Ser. No. 11/237,002 filed Sep. 28. 2005, which is hereby incorporated herein by reference in its entirety; and U.S. application Ser. No. 11/237,227 filed Sep. 28, 2005, which is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to processing of signals in communication systems. More specifically, certain embodiments of the invention relate to a method and system for increasing data rate in a mobile terminal using spatial multiplexing for digital video broadcasting for handhelds (DVB-H) communication.

BACKGROUND OF THE INVENTION

Broadcasting and telecommunications have historically occupied separate fields. In the past, broadcasting was largely an "over-the-air" medium while wired media carried telecommunications. That distinction may no longer apply as both broadcasting and telecommunications may be delivered over either wired or wireless media. Present development may adapt broadcasting to mobility services. One limitation has been that broadcasting may often require high bit rate data transmission at rates higher than could be supported by existing mobile communications networks. However, with emerging developments in wireless communications technology, even this obstacle may be overcome.

Terrestrial television and radio broadcast networks have made use of high power transmitters covering broad service areas, which enable one-way distribution of content to user equipment such as televisions and radios. By contrast, wireless telecommunications networks have made use of low power transmitters, which have covered relatively small areas known as "cells". Unlike broadcast networks, wireless networks may be adapted to provide two-way interactive services between users of user equipment such as telephones and computer equipment.

The introduction of cellular communications systems in the late 1970's and early 1980's represented a significant advance in mobile communications. The networks of this period may be commonly known as first generation, or "1G" systems. These systems were based upon analog, circuit-switching technology, the most prominent of these systems may have been the advanced mobile phone system (AMPS). Second generation, or "2G" systems ushered improvements in performance over 1G systems and introduced digital technology to mobile communications. Exemplary 2G systems include the global system for mobile communications (GSM), digital AMPS (D-AMPS), and code division multiple access (CDMA). Many of these systems have been designed according to the paradigm of the traditional telephony architecture, often focused on circuit-switched services, voice traffic, and supported data transfer rates up to 14.4 kbits/s. Higher data rates were achieved through the deployment of "2.5G" networks, many of which were adapted to existing 2G network infrastructures. The 2.5G networks began the introduction of packet-switching technology in wireless networks. However, it is the evolution of third generation, or "3G" technology that may introduce fully packet-switched networks, which support high-speed data communications.

The general packet radio service (GPRS), which is an example of a 2.5G network service oriented for data communications, comprises enhancements to GSM that required additional hardware and software elements in existing GSM network infrastructures. Another 2.5G network, enhanced data rates for GSM evolution (EDGE), also comprises enhancements to GSM, and like GPRS, EDGE may allocate up to 8 time slots in a TDMA frame for packet-switched, or packet mode, transfers. The universal mobile telecommunications system (UMTS) is an adaptation of a 3G system, which is designed to offer integrated voice, multimedia, and Internet access services to portable user equipment. The UMTS adapts wideband CDMA (W-CDMA) to support data transfer rates, which may be as high as 2 Mbits/s. A related 3G technology, high speed downlink packet access (HSDPA), is an Internet protocol (IP) based service oriented for data communications, which adapts W-CDMA to support data transfer rates of the order of 10 Mbits/s. The multiple broadcast/ multicast service (MBMS) is an IP datacast service, which may be deployed in EDGE and UMTS networks.

Standards for digital television terrestrial broadcasting (DTTB) have evolved around the world with different systems being adopted in different regions. The three leading DTTB systems are, the advanced standards technical committee (ATSC) system, the digital video broadcast terrestrial (DVB-T) system, and the integrated service digital broadcasting terrestrial (ISDB-T) system. The ATSC system has largely been adopted in North America, South America, Taiwan, and South Korea. This system adapts trellis coding and 8-level vestigial sideband (8-VSB) modulation. The DVB-T system has largely been adopted in Europe, the Middle East, Australia, as well as parts of Africa and parts of Asia. The DVB-T system adapts coded orthogonal frequency division multiplexing (COFDM). The OFDM spread spectrum technique may be utilized to distribute information over many carriers that are spaced apart at specified frequencies. The OFDM technique may also be referred to as multi-carrier or discrete multi-tone modulation. The spacing between carriers may prevent the demodulators in a radio receiver from seeing frequencies other than their corresponding frequency. This technique may result in spectral efficiency and lower multi-path distortion, for example.

The ISDB-T system has been adopted in Japan and adapts bandwidth segmented transmission orthogonal frequency division multiplexing (BST-OFDM). The various DTTB systems may differ in important aspects; some systems employ a 6 MHz channel separation, while others may employ 7 MHz or 8 MHz channel separations. Planning for the allocation of frequency spectrum may also vary among countries with some countries integrating frequency allocation for DTTB services into the existing allocation plan for legacy analog broadcasting systems. In such instances, broadcast towers for DTTB may be co-located with broadcast towers for analog broadcasting services with both services being allocated similar geographic broadcast coverage areas. In other countries, frequency allocation planning may involve the deployment of single frequency networks (SFNs), in which a plurality of towers, possibly with overlapping geographic broadcast coverage areas (also known as "gap fillers"), may simultaneously broadcast identical digital signals. SFNs may provide very efficient use of broadcast spectrum as a single frequency may be used to broadcast over a large coverage area in contrast to some of the conventional systems, which may be used for analog broadcasting, in which gap fillers transmit at different frequencies to avoid interference.

While 3G systems are evolving to provide integrated voice, multimedia, and data services to mobile user equipment, there may be compelling reasons for adapting DTTB systems for this purpose. One of the more notable reasons may be the high data rates that may be supported in DTTB systems. For example, DVB-T may support data rates of 15 Mbits/s in an 8 MHz channel in a wide area SFN. There are also significant challenges in deploying broadcast services to mobile user equipment. Many handheld portable devices, for example, may require that services consume minimum power to extend battery life to a level, which may be acceptable to users. Another consideration is the Doppler effect in moving user equipment, which may cause inter-symbol interference in received signals. Among the three major DTTB systems, ISDB-T was originally designed to support broadcast services to mobile user equipment. While DVB-T may not have been originally designed to support mobility broadcast services, a number of adaptations have been made to provide support for mobile broadcast capability. The adaptation of DVB-T to mobile broadcasting is commonly known as DVB handheld (DVB-H).

To meet requirements for mobile broadcasting the DVB-H specification may support time slicing to reduce power consumption at the user equipment, addition of a 4K mode to enable network operators to make tradeoffs between the advantages of the 2K mode and those of the 8K mode, and an additional level of forward error correction on multi-protocol encapsulated data - forward error correction (MPE-FEC) to make DVB-H transmissions more robust to the challenges presented by mobile reception of signals and to potential limitations in antenna designs for handheld user equipment. DVB-H may also use the DVB-T modulation schemes, like QPSK and 16-quadrature amplitude modulation (16-QAM), which may be more resilient to transmission errors. MPEG audio and video services may be more resilient to error than data, thus additional forward error correction may not be required to meet DTTB service objectives. In some instances, the DVB-T 2K mode may not be able to accommodate the high Doppler effects that may occur in large scale SFNs. Using 16-QAM modulation in DVT-T may achieve high data rates of 9.95 Mbps, for example, when B=8 MHz, R=½, and GI=¼. However, the use of higher order modulation to achieve increased data rates may result in higher system sensitivity to fading and/or Doppler effects, which in turn, may require higher transmission power.

Overall system improvements for cellular and DVB-based technologies may also be achieved by using multiple transmit and/or receive antennas. These multi-antenna configurations, also known as smart antenna techniques, may be utilized to reduce the negative effects of multipath and/or signal interference may have on signal reception. It is anticipated that smart antenna techniques may be increasingly utilized both in connection with the deployment of base station infrastructure and mobile subscriber units in cellular systems to address the increasing capacity demands being placed on those systems. However, the widespread deployment of multi-antenna systems in wireless communications, particularly in wireless handset devices, has been somewhat limited by the increased cost that results from increased size, complexity, and power consumption, particularly in mobile terminals. The necessity of providing a separate RF chain for each transmit and receive antenna is a direct factor in the increased cost of multi-antenna systems. In certain existing single-antenna mobile terminals, the single required RF chain may account for over 30% of the receiver's total cost. It is therefore apparent that as the number of transmit and receive antennas increases, the system complexity, power consumption, and overall cost may increase.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for increasing data rate in a mobile terminal using spatial multiplexing for digital video broadcasting for handhelds (DVB-H) communication, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Figure 1A:
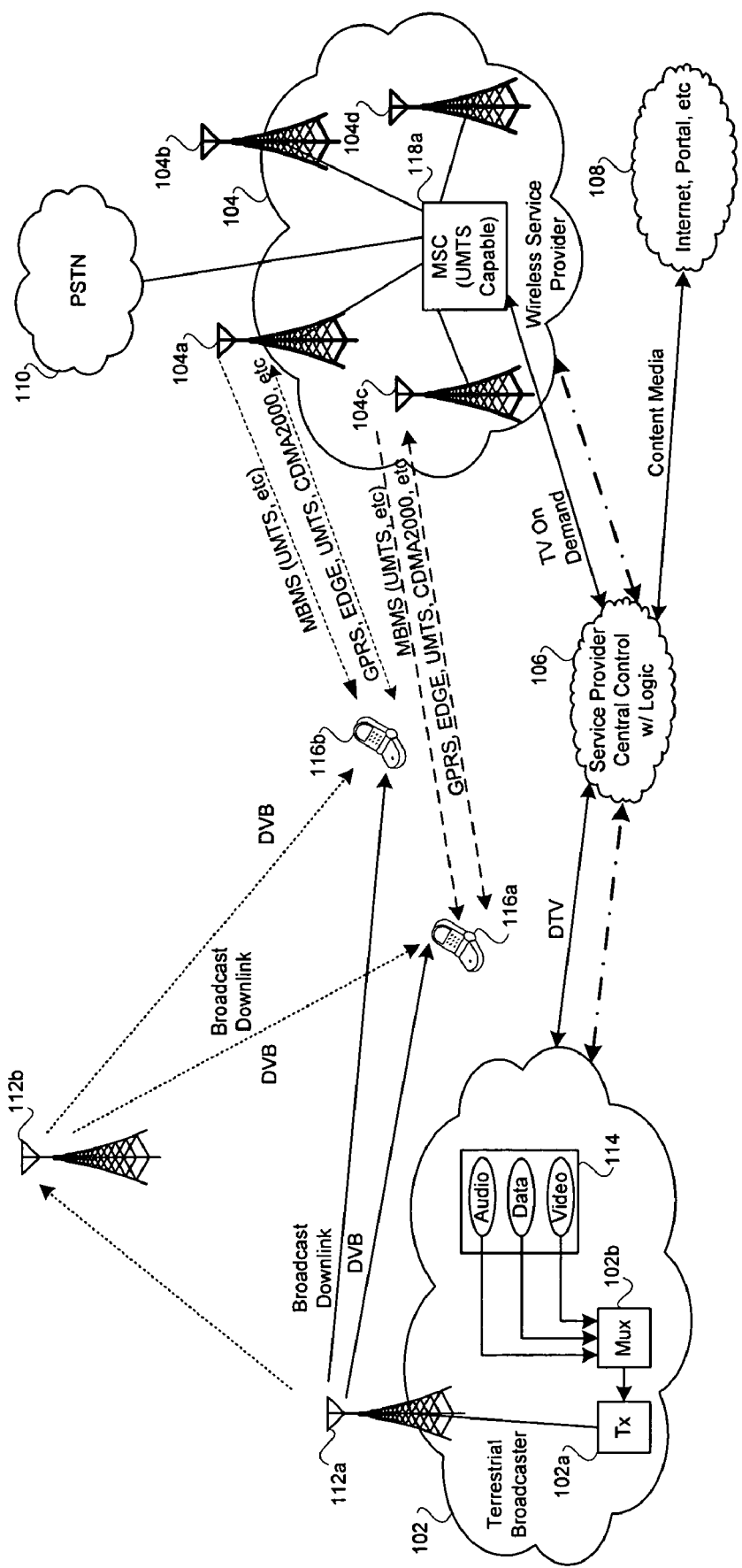
FIG. 1A is a block diagram of an exemplary system for providing integrated services to a plurality of mobile terminals via a cellular network and/or a digital video broadcast network, in accordance with an embodiment of the invention.

Certain embodiments of the invention may be found in a system and/or method for increasing data rate in a mobile terminal using spatial multiplexing for digital video broadcasting for handhelds (DVB-H) communication. In accordance with various embodiments of the invention, a reconfigurable orthogonal frequency division multiplexing (OFDM) chip may be utilized in a mobile terminal to process received spatially multiplexed signals. The mobile terminal may be utilized in a spatially multiplexed multiple-input-multiple-output (SM-MIMO) wireless system. The spatially multiplexed signals may be quadrature phase shift keying (QPSK) modulated and may utilize OFDM subcarries. A processor may be utilized to configure the OFDM chip to process signals such as IEEE 802.11 and 802.16, and DVB. The OFDM chip may generate channel weights to be applied to the spatially multiplexed signals received in multiple receive antennas. The weighted signals may be combined to generate multiple radio frequency (RF) received signals from which channel estimates may be generated. Subsequent channel weights may be dynamically generated from generated channel estimates. In some instances, the use of QPSK modulated spatially multiplexed MIMO systems that utilize mobile terminals comprising a single configurable OFDM chip may enable delivery of high data rates in DVB communications that provide acceptable performance to high Doppler effects.

Spatial multiplexing (SM) may provide a mode of signal transmission predicated upon the use of multiple antennas at both a transmitter and a receiver, for example, in such a way that the capacity of a wireless radio link may be increased without correspondingly increasing power or bandwidth consumption. In a case in which N antennas are used at both a transmitter and a receiver, an input stream of information symbols provided to the transmitter is divided into N independent substreams. Spatial multiplexing contemplates that each of these N independent substreams may occupy the same "space-time channel", for example, time slot, frequency, or code/key sequence, of the applicable multiple-access protocol. Within the transmitter, each substream may be separately applied to the N transmit antennas and propagated over an intervening multipath communication channel to a receiver. Error correction coding may be applied to each of the N streams separately or in a combined space-time methodology.

The composite multipath signals may then be received by an array of N or more receive antennas deployed at the receiver. At the receiver, a "spatial signature" defined by the N phases and N amplitudes arising at the receive antenna array for a given substream may be then estimated. Signal processing techniques may be then applied in order to spatially separate the received signals, which may allow the original substreams to be recovered and synthesized into the original input symbol stream. An overall system capacity of the order of the minimum of M and N, min(M,N), for example, may be achieved, where M may be the number of receive antennas and N may be the number of transmit antennas for flat fading channel conditions.

FIG. 1A is a block diagram of an exemplary system for providing integrated services to a plurality of mobile terminals via a cellular network and/or a digital video broadcast network, in accordance with an embodiment of the invention. Referring to FIG. 1A, there is shown terrestrial broadcaster network 102, wireless service provider network 104, service provider 106, portal 108, public switched telephone network (PSTN) 110, and mobile terminals (MTs) 116a and 116b. The terrestrial broadcaster network 102 may comprise transmitter (Tx) 102a, multiplexer (Mux) 102b, and information content source 114. The content source 114 may also be referred to as a data carousel, which may comprise audio, data and video content. The terrestrial broadcaster network 102 may also comprise DVB broadcast antennas 112a and 112b that may be adapted to transmit DVB-based information, such as DVB-T or DVB-H, to the MTs 116a and 116b. The wireless service provider network 104 may comprise mobile switching center (MSC) 118a, and a plurality of cellular base stations 104a, 104b, 104c, and 104d.

The terrestrial broadcaster network 102 may comprise suitable equipment that may be adapted to encode and/or encrypt data for transmission via the transmitter 102a. The transmitter 102a in the terrestrial broadcaster network 102 may be adapted to utilize DVB broadcast channels to communicate information to the mobile terminals 116a, 116b. The multiplexer 102b associated with the terrestrial broadcaster network 102 may be utilized to multiplex data from a plurality of sources. For example, the multiplexer 102b may be adapted to multiplex various types of information such as audio, video and/or data into a single pipe for transmission by the transmitter 102a. Content media from the portal 108, which may be handled by the service provider 106 may also be multiplexed by the multiplexer 102b. The portal 108 may be an ISP service provider.

In one aspect of the invention, the terrestrial broadcaster network 102 may be adapted to provide one or more digital television (DTV) channels to the service provider 106. In this regard, the terrestrial broadcaster network 102 may comprise suitable high-speed or broadband interfaces that may be utilized to facilitate transfer of the DTV channels from the terrestrial broadcast network 102 to the service provider. The service provider 106 may then utilize at least a portion of the DTV channels to provide television (TV) on demand service, or other similar types of services to the wireless service provider network 104. Accordingly, the service provider 106 may further comprise suitable high-speed or broadband interfaces that may be utilized to facilitate the transfer of related TV on demand information to the MSC 118a. The communication links between the terrestrial broadcast network 102 and the service provider 106 and the communication links between the service provider 106 and the wireless service provider 104 may be wired and/or wireless communication links.

The wireless service provider network 104 may be a cellular or personal communication service (PCS) provider that may be adapted to handle broadcast UMTS (B-UMTS). The term cellular as utilized herein refers to both cellular and PCS frequencies bands. Hence, usage of the term cellular may comprise any band of frequencies that may be utilized for cellular communication and/or any band of frequencies that may be utilized for PCS communication. Notwithstanding, broadcast UMTS (B-UMTS) may also be referred to as MBMS. MBMS is a high-speed data service that is overlaid on WCDMA to provide much higher data rates than may be provided by core WCDMA. In this regard, the B-UMTS services may be superimposed on the cellular or PCS network.

The wireless service provider network 104 may utilize cellular or PCS access technologies such as GSM, CDMA, CDMA2000, WCDMA, AMPS, N-AMPS, and/or TDMA. The cellular network may be utilized to offer bidirectional services via uplink and downlink communication channels, while the B-UMTS or MBMS network may be utilized to provide a unidirectional broadband services via a downlink channel. The B-UMTS or MBMS unidirectional downlink channel may be utilized to broadcast content media and/or multimedia type information to the mobile terminals 116a and 116b. Although MBMS provides only unidirectional downlink communication, the invention may be not so limited. In this regard, other bidirectional communication methodologies comprising uplink and downlink capabilities, whether symmetric or asymmetric, may be utilized.

Although the wireless service provider network 104 is illustrated as a GSM, CDMA, WCDMA based network and/or variants thereof, the invention is not limited in this regard. Accordingly, the wireless service provider network 104 may be an 802.11 based wireless network or wireless local area network (WLAN). The wireless service provider network 104 may also be adapted to provide 802.11 based wireless communication in addition to GSM, CDMA, WCDMA, CDMA2000 based network and/or variants thereof. In this case, the mobile terminals 116a, 116b may also be compliant with the 802.11 based wireless network.

In accordance with an exemplary embodiment of the invention, if the mobile terminal (MT) 116a is within an operating range of the DVB broadcasting antenna 112a and moves out of the latter's operating range and into an operating range of the DVB broadcasting antenna 112b, then DVB broadcasting antenna 112b may be adapted to provide DVB-H broadcast services to the mobile terminal 116a. If the mobile terminal 116a subsequently moves back into the operating range of the DVB broadcasting antenna 112a, then the broadcasting antenna 112a may be adapted to provide DVB-H broadcasting service to the mobile terminal 116a. In a somewhat similar manner, if the mobile terminal (MT) 116b is within an operating range of the DVB broadcasting antenna 112b and moves out of the latter's operating range and into an operating range of the broadcasting antenna 112a, then the DVB broadcasting antenna 112a may be adapted to provide DVB-H broadcasting service to the mobile terminal 116b. If the mobile terminal 116b subsequently moves back into the operating range of broadcasting antenna 112b, then the DVB broadcasting antenna 112b may be adapted to provide DVB-H broadcast services to the mobile terminal 116b.

The service provider 106 may comprise suitable interfaces, circuitry, logic and/or code that may be adapted to facilitate communication between the terrestrial broadcasting network 102 and the wireless communication network 104. In an illustrative embodiment of the invention the service provider 106 may be adapted to utilize its interfaces to facilitate exchange control information with the terrestrial broadcast network 102 and to exchange control information with the wireless service provider 104. The control information exchanged by the service provider 106 with the terrestrial broadcasting network 102 and the wireless communication network 104 may be utilized to control certain operations of the mobile terminals, the terrestrial broadcast network 102 and the wireless communication network 104.

The portal 108 may comprise suitable logic, circuitry and/or code that may be adapted to provide content media to the service provider 106 via one or more communication links. These communication links, although not shown, may comprise wired and/or wireless communication links. The content media that may be provided by the portal 108 may comprise audio, data, video or any combination thereof. In this regard, the portal 108 may be adapted to provide one or more specialized information services to the service provider 106.

The public switched telephone network (PSTN) 110 may be coupled to the MSC 118a. Accordingly, the MSC 118a may be adapted to switch calls originating from within the PSTN 110 to one or more mobile terminals serviced by the wireless service provider 104. Similarly, the MSC 118a may be adapted to switch calls originating from mobile terminals serviced by the wireless service provider 104 to one or more telephones serviced by the PSTN 110.

The information content source 114 may comprise a data carousel. In this regard, the information content source 114 may be adapted to provide various information services, which may comprise online data including audio, video and data content. The information content source 114 may also comprise file download, and software download capabilities. In instances where a mobile terminal fails to acquire requested information from the information content source 114 or the requested information is unavailable, then the mobile terminal may acquire the requested information via, for example, a B-UMTS from the portal 108. The request may be initiated through an uplink cellular communication path.

The mobile terminals (MTs) 116a and 116b may comprise suitable logic, circuitry and/or code that may be adapted to handle the processing of uplink and downlink cellular channels for various access technologies and broadcast DVB-H technologies. In an exemplary embodiment of the invention, the mobile terminals 116a, 116b may be adapted to utilize one or more cellular access technologies such as GSM, GPRS, EDGE, CDMA, WCDMA, CDMA2000, HSDPA and MBMS (B-UMTS). The mobile terminal may also be adapted to receive and process DVB-H broadcast signals in the DVB-H bands. For example, a mobile terminal may be adapted to receive and process DVB-H signals. A mobile terminal may be adapted to request information via a first cellular service and in response, receive corresponding information via a DVB-H broadcast service. A mobile terminal may also be adapted to request information from a service provider via a cellular service and in response, receive corresponding information via a data service, which is provided via the cellular service. The mobile terminals may also be adapted to receive DVB-H broadcast information from either the base stations 104a, 104b, 104c, 104d or the DVB-H broadcast antennas 112a and 112b. In instances where a mobile terminal receives broadcast information from any of the base stations 104a, 104b, 104c, or 104d via a downlink MBMS communication channel, then the mobile terminal may communicate corresponding uplink information via an uplink cellular communication channel.

Figure 1B:
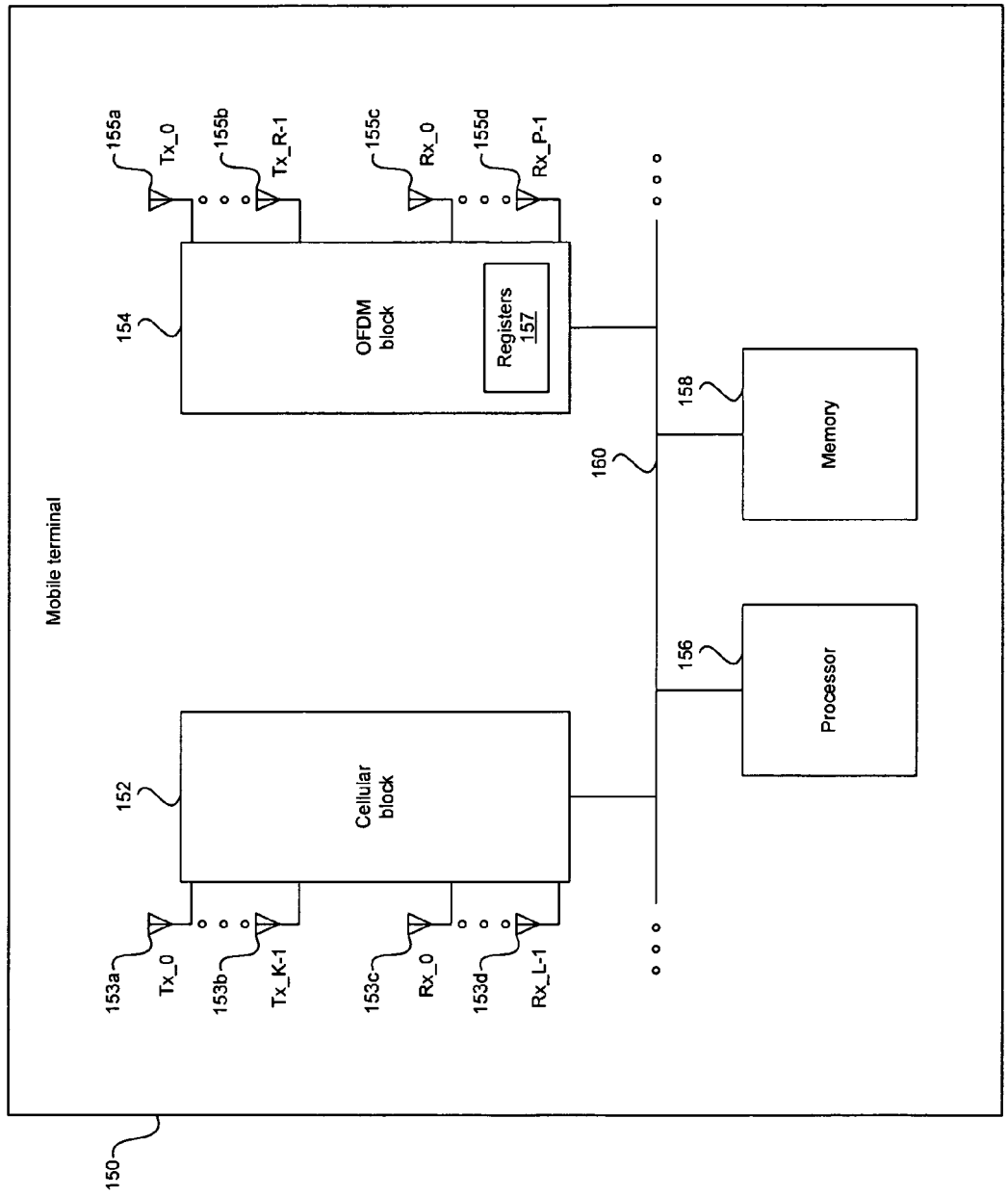
FIG. 1B is a block diagram of a mobile terminal comprising an exemplary cellular and OFDM collaboration subsystem with single channel weight diversity, in accordance with an embodiment of the invention.

FIG. 1B is a block diagram of a mobile terminal comprising an exemplary cellular and OFDM collaboration subsystem with single channel weight diversity, in accordance with an embodiment of the invention. Referring to FIG. 1B, there is shown a mobile terminal 150 that may comprise a cellular block 152, an OFDM block 154, a processor 156, a memory 158, and a common bus 160. The OFDM block 154 may comprise a plurality of registers 157. The mobile terminal 150 may be utilized for receiving and/or transmitting cellular and/or OFDM-based information, such as DVB-H information for example. The cellular block 152 may comprise suitable logic, circuitry, and/or code that may be adapted to process cellular information. The cellular block 152 may be adapted to transmit cellular information via at least one transmit antenna. In this regard, there are shown K transmit antennas 153a (Tx_0), . . . , 153b (Tx_K–1) in FIG. 1B. When K>1 the cellular block 152 may support transmit diversity techniques, for example. The cellular block 152 may also be adapted to receive cellular information via at least one receive antenna. In this regard, there are shown L receive antennas 153c (Rx_0), . . . , 153d (Rx_L–1) in FIG. 1B. When L >1 the cellular block 152 may support receive diversity techniques, for example. The cellular block 152 may be adapted to support at least one of a plurality of cellular technologies described in FIG. 1 such as CDMA, WCDMA, HSDPA, GSM, and/or UMTS, for example.

The cellular block 152 may be adapted to transfer data and/or control information to the OFDM block 154 via the common bus 160. In some instances, the cellular block 152 may transfer data and/or control information to the OFDM block 154 via the common bus 160 directly. In other instances, the data and/or control information may be first transferred from the cellular block 152 to the memory 156 via the common bus 160 and then transferred from the memory 156 to the OFDM block 154 via the common bus 160.

The OFDM block 154 may comprise suitable logic, circuitry, and/or code that may be adapted to process information communicated by OFDM modulation techniques. The OFDM block 154 may be adapted to transmit information via at least one transmit antenna. In this regard, there are shown R transmit antennas 155a (Tx_0), . . . 155b (Tx_R–1). When R>1 the OFDM block 154 may support transmit diversity techniques, for example. An exemplary diversity technique that may be utilized by the OFDM block 154 for transmission is spatial multiplexing with single weight diversity. The OFDM block 154 may also be adapted to receive information via at least one receive antenna. In this regard, there are shown P receive antennas 155c (Rx_0), . . . , 155d (Rx_P–1) in FIG. 1B. When P>1 the OFDM block 154 may support receive diversity techniques, for example. An exemplary diversity technique that may be utilized by the OFDM block 154 for reception is spatial multiplexing with single weight diversity. U.S. Pat. application Ser. No. 11/172,756, U.S. Pat. application Ser. No. 11/173,305, and U.S. application Pat. Ser. No. 11/172,759 provide a detailed description of channel estimation and single weight generation for spatial multiplexing MIMO systems and are hereby incorporated herein by reference in their entirety. The OFDM block 154 may be adapted to support at least one of a plurality of OFDM-based technologies such as wireless local area networks (WLANs) based on IEEE 802.11, wireless metropolitan area networks (WMANs) based on 802.16, and digital video broadcasting for handhelds (DVB-H), for example.

The OFDM block 154 may be adapted to transfer data and/or control information to the cellular block 152 via the common bus 160. In some instances, the OFDM block 154 may transfer data and/or control information to the cellular block 155 via the common bus 160 directly. In other instances, the data and/or control information may be first transferred from the OFDM block 154 to the memory 156 via the common bus 160 and then transferred from the memory 156 to the OFDM block 154 via the common bus 160.

The OFDM block 154 may be a configurable device and at least a portion of the OFDM block 154 may be configured in accordance with one of the OFDM technologies that may be supported. For example, certain aspects in the OFDM block 154 that may be configured may comprise forward error correction (FEC), parsing, interleaving, mapping, fast Fourier transformations (FFTs), and/or guard interval insertion. Other aspects of the OFDM block 154 that may be configured may comprise operating bandwidth, auto detection of multiple preambles, channel estimation, and/or header cyclic redundancy check (CRC) length, for example. In this regard, the plurality of registers 157 may comprise suitable logic, circuitry, and/or code that may be adapted to store values and/or parameters that correspond to the configurable aspects of the OFDM block 154. To configure the OFDM block 154, the values and/or parameters to be stored in the plurality of registers 157 may be transferred from the memory 158 via the common bus 160 based on at least one control signal generated by the processor 156, for example.

The processor 156 may comprise suitable logic, circuitry, and/or code that may be adapted to perform control and/or management operations for the mobile terminal 150. In this regard, the processor 156 may be adapted to generate at least one signal for configuring the OFDM block 154. Moreover, the processor 156 may be adapted to arbitrate and/or schedule communications between the cellular block 152 and the OFDM block 154 when collaborative communication is to be utilized. In some instances, the arbitration and/or scheduling operation may be performed by logic, circuitry, and/or code implemented separately from the processor 156. The processor 156 may also be adapted to control single weight diversity operations in the OFDM block 154. For example, the processor 156 may control the integration time utilized when generating channel weights for receive and/or transmit antennas in the OFDM block 154. The processor 156 may also control the dynamic update of the channel weights. The memory 158 may comprise suitable logic, circuitry, and/or code that may be adapted to store information that may be utilized by the cellular block 152, the OFDM block 154, and/or the processor 156. In this regard, the memory 158 may store parameters associated with the various configurations supported by the OFDM block 154.

In operation, when an OFDM configuration mode has been selected, the processor 156 may generate at least one signal to transfer configuration information from the memory 156 to the plurality of registers 157 in the OFDM block 154 via the common bus 160. In this regard, exemplary OFDM configuration modes may comprise WLAN modes, WMAN modes, and DVB-H modes. The OFDM block 154 may receive and transmit information in accordance to the OFDM configuration mode currently supported. Similarly, the cellular block 152 may receive and/or transmit cellular information. When single weight diversity is supported by the transmit and/or receive operations of the OFDM block 154, appropriate channel weights may be generated by the OFDM block 154 to at least one of the transmit antennas 155a (Tx_0), . . . , 155b (Tx$_{13}$ R–1) and/or at lest one of the receive antennas 155c (Rx_0), . . . , 155d (Rx_P–1).

When cellular communication may be more efficiently performed via the OFDM block 154, the processor 156 may coordinate the transfer of information from the cellular block 152 to the OFDM block 154. In this regard, information from the cellular block 152 may be transferred to the memory 158 and then from the memory 158 to the OFDM block 154. Similarly, when OFDM-based communication may be more efficiently performed via the cellular block 152, the processor 156 may coordinate the transfer of information from the OFDM block 154 to the cellular block 152. In this regard, information from the OFDM block 154 may be transferred to the memory 158 and then from the memory 158 to the cellular block 152.

Figure 1C:
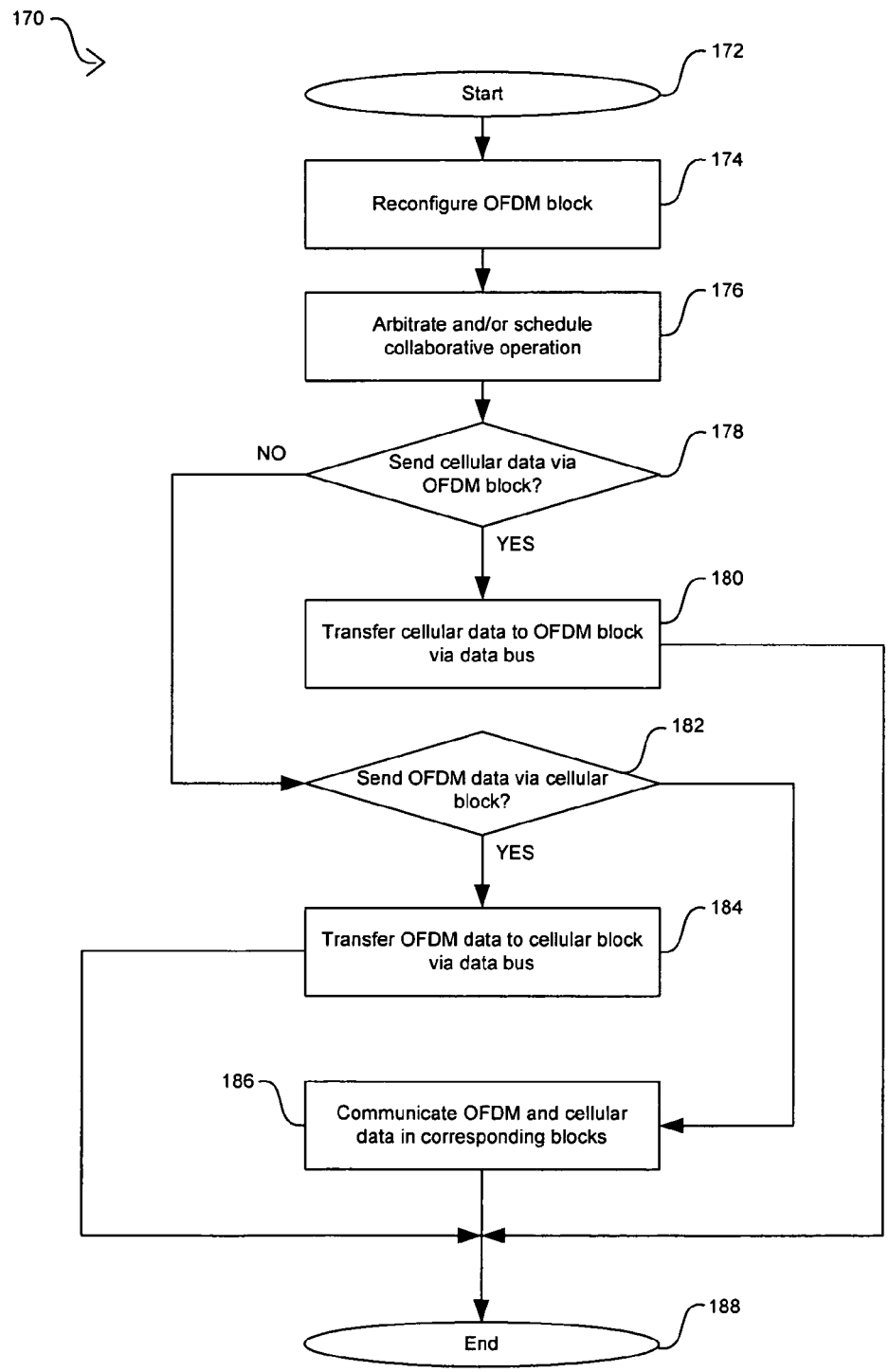
FIG. 1C is a flow chart illustrating exemplary steps for cellular and OFDM collaboration in the mobile terminal of FIG. 1B, in accordance with an embodiment of the invention.

FIG. 1C is a flow chart illustrating exemplary steps for cellular and OFDM collaboration in the mobile terminal of FIG. 1B, in accordance with an embodiment of the invention. Referring to FIG. 1C, there is shown a flow diagram 170 for collaborative operation of cellular and OFDM communication in the mobile terminal 150 in FIG. 1B. After start step 172, in step 174, the processor 156 may configure the OFDM block 154 to operate in one of a plurality of OFDM configuration modes. The parameters that support each OFDM configuration mode may be transferred to the plurality of registers 157 in the OFDM block from the memory 156.

In step 176, the processor 156 may arbitrate and/or schedule collaborative communication between the cellular block 152 and the OFDM block 154. In this regard, the processor 156 may determine, based on information provided by the cellular block 152 and/or the OFDM block 154, whether cellular data may be communicated by utilizing the OFDM block 154 or whether OFDM-based information may be communicated by utilizing the cellular block 152. For example, when the quality of WCDMA communication links supported by the cellular block 152 becomes low and the transmission rate via that WCDMA communication link degrades, the cellular block 152 may generate a signal to the processor 156 to provide access to the cellular data to its recipient via the OFDM block 154. Similarly, when the quality of, for example, DVB-H communication links supported by the OFDM block 154 becomes low and the transmission rate via that DVB-H communication link degrades, the OFDM block 154 may generate a signal to the processor 156 to provide access to the DVB-H information to its recipient via the cellular block 152. In either case, the processor 156 may request information from the other block to determine whether the necessary resources for collaboration are available. When the resources are available, collaboration between the OFDM block 154 and the cellular block 152 may be implemented.

In step 178, when the processor 156 determines that cellular data may be sent via the OFDM block 154, that is, collaboration may be implemented, the process may proceed to step 180. In step 180, the cellular data may be transferred to the OFDM block 154 from the cellular block 152 via the common bus 160. In this regard, the cellular data may be first stored in the memory 158 before final transfer to the OFDM block 154. After step 180 the process may proceed to end step 188.

Returning to step 178, when the processor 156 determines that cellular data may not be sent via the OFDM block 154, that is, collaboration may not be implemented, the process may proceed to step 182. In step 182, when the processor 156 determines that OFDM data may be sent via the cellular block 152, that is, collaboration may be implemented, the process may proceed to step 184. In step 184, the OFDM data may be transferred to the cellular block 152 from the OFDM block 154 via the common bus 160. In this regard, the OFDM data may be first stored in the memory 158 before final transfer to the cellular block 152. After step 184 the process may proceed to end step 188.

Returning to step 182, when the processor 156 determines that OFDM data may not be sent via the cellular block 152, that is, collaboration may not be implemented, the process may proceed to step 186. In step 186, the cellular data may be sent via the cellular block 152 and/or the OFDM data may be sent via the OFDM block 154 in accordance with the communication rates that may be supported by each of those blocks. In this regard, when collaboration may not be implemented, the cellular communication and the OFDM-based communication of the mobile terminal 150 may each be limited by their corresponding communication links.

Figure 2A:
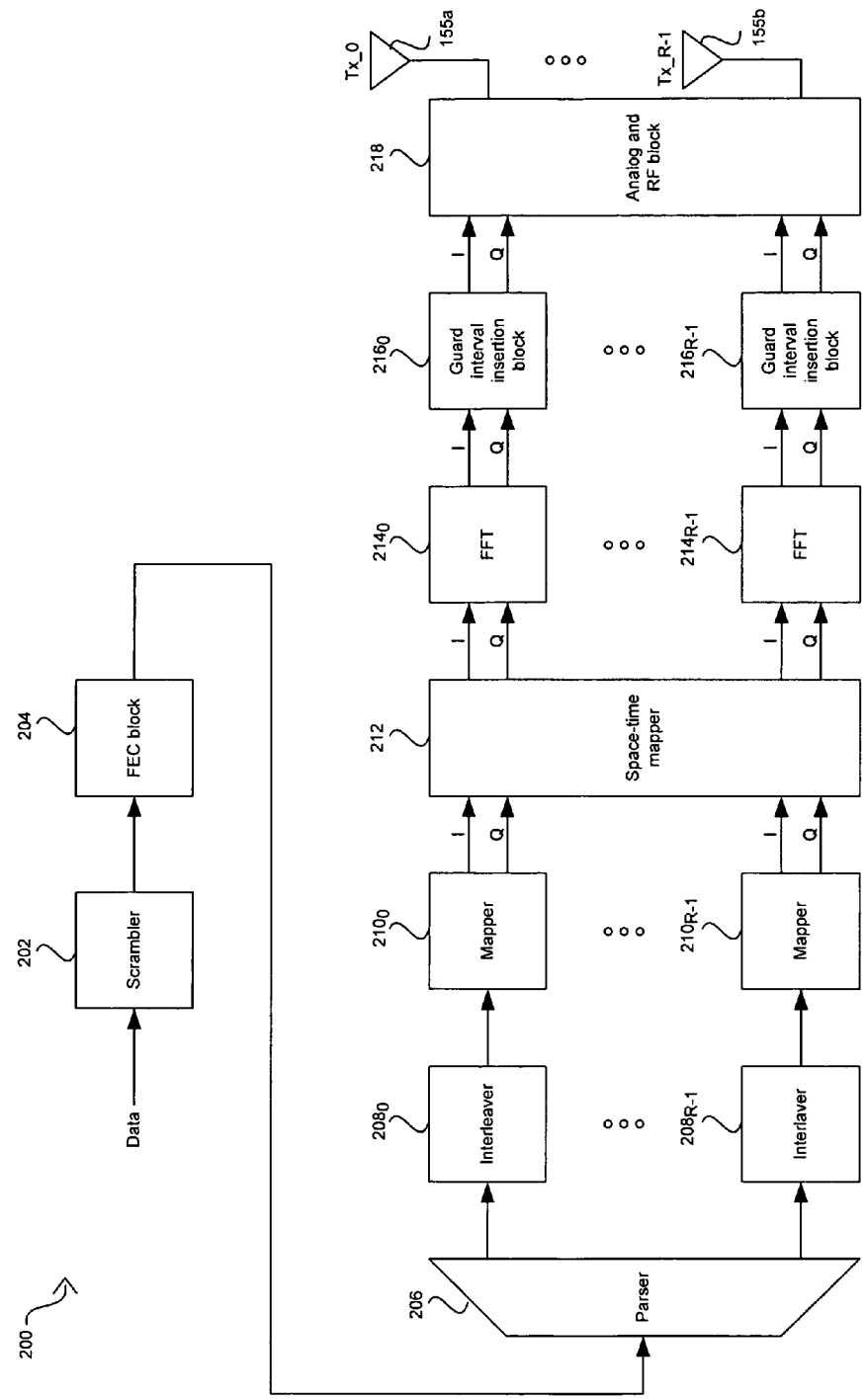
FIG. 2A is a block diagram of the mobile terminal of FIG. 1B illustrating an exemplary transmitter portion of a reconfigurable OFDM chip with spatial multiplexing, in accordance with an embodiment of the invention.

FIG. 2A is a block diagram of the mobile terminal of FIG. 1B illustrating an exemplary transmitter portion of a reconfigurable OFDM chip with spatial multiplexing, in accordance with an embodiment of the invention. Referring to FIG. 2A, there is shown a transmit portion 200 that may be implemented in the OFDM block 154 of the mobile terminal 150 in FIG. 1B. The transmit portion 200 may comprise a scrambler 202, a forward error correction (FEC) block 204, a parser 206, a plurality of interleavers $208_0 \ldots {}_{R-1}$, a plurality of mappers $210_0 \ldots {}_{R-1}$, a space-time mapper 212, a plurality of Inverse Fast Fourier Transforms (IFFTs) $214_0 \ldots {}_{R-1}$, a plurality of guard interval insertion blocks $216_0 \ldots {}_{R-1}$, and an analog and RF block 218. Moreover, the R transmit antennas 155a (Tx_0), . . . , 155b (Tx_R-1) may be coupled to the analog and RF block 218, for example.

The scrambler 202 may comprise suitable logic, circuitry, and/or code that may be adapted to modify the input data. The scrambler 202 may buffer the input data and may utilize an algorithm, for example, to modify the buffered input data. The processor 156 in FIG. 1B may configure the operations of the scrambler 202. In this regard, the processor 156 may transfer configuration information for the scrambler 202 to the registers 157. The output of the scrambler 202 may be transferred to the FEC block 204. The FEC block 204 may comprise suitable logic, circuitry, and/or code that may be adapted to encode the output of the scrambler 202. The FEC block 204 may be adapted to implement a Reed-Solomon error correction encoding operation, for example. The processor 156 may configure the operations of the FEC block 204, for example. The parser 206 may comprise suitable logic, circuitry, an/or code that may be adapted to convert the output of the FEC block 204 into a plurality of channel signals. The parser 206 may convert the output of the FEC block 204 into R channel signals, for example, where the R channel signals correspond to the R transmit antennas 155a (Tx_0), . . . , 155b (Tx_R-1).

The interleavers $208_0 \ldots {}_{R-1}$ may reorder or rearrange the order of the encoded symbols generated by the FEC block 204. The interleaving operation may be implemented to protect the data against localized corruption or burstness in errors. The interleavers $208_0 \ldots {}_{R-1}$ may be adapted to perform a convolutional encode, for example, on the R channel signals. When the interleavers $208_0 \ldots {}_{R-1}$ are implemented utilizing a convolutional encoder, the convolutional encoder may be configured to an encoding rate of R=½, and an encoder's length constraint ranging between K=7 and K=9, for example. When a puncturer is utilize by the interleavers $208_0 \ldots {}_{R-1}$, the rates of the puncturer may be configured to ⅔, ¾, or ⅚, for example. A puncturer may be utilized to periodically delete selected bits to reduce coding overhead. The processor 156 may configure the operations of the interleavers $208_0 \ldots {}_{R-1}$, for example.

The mappers $210_0 \ldots {}_{R-1}$ may comprise suitable logic, circuitry, and/or code that may be adapted to map the corresponding outputs of interleavers $208_0 \ldots {}_{R-1}$ to a specified modulation constellation. For example, the mappers $210_0 \ldots {}_{R-1}$ may be adapted to perform X-QAM, where X indicates the size of the constellation to be used for quadrature amplitude modulation, such as 16-QAM or 64-QAM. The mappers $210_0 \ldots {}_{R-1}$ may also be adapted to map the corresponding outputs of the interleavers $208_0 \ldots {}_{R-1}$ to quadrature phase shift keying (QPSK) or binary phase shift keying (BPSK), for example. Moreover, the mapping performed by the mappers $210_0 \ldots {}_{R-1}$ may result in an in-phase (I) data stream and a phase quadrature (Q) data stream. The processor 156 may configure the operations of the mappers $210_0 \ldots {}_{R-1}$ such as the type of constellation encoding to be utilized, for example. When operating in an OFDM configuration mode that supports DVB-H communications, the mappers $210_0 \ldots _{R-1}$ may map the input signals to a QPSK constellation, for example.

The space-time mapper 212 may comprise suitable logic, circuitry, and/or code that may be adapted to map the outputs from the mappers $210_0 \ldots _{R-1}$ to the inputs of the IFFTs $214_0 \ldots _{R-1}$. The space-time mapper 212 may be adapted to provide direct or indirect mapping between the output of the mappers $210_0 \ldots _{R-1}$ and the inputs to the IFFTs $214_0 \ldots _{R-1}$. The processor 156 may configure the mapping operations of the space-time mapper 212, for example.

The IFFTs $214_0 \ldots _{R-1}$ may comprise suitable logic, circuitry, and/or code that may be adapted to perform inverse fast Fourier transformations on the I and Q data streams provided by the space-time mapper 212. The IFFTs $214_0 \ldots _{R-1}$ may be adapted to have a range from 64 points to 8K points, for example. The IFFTs $214_0 \ldots _{R-1}$ may be implemented as a one-dimensional IFFT for data, text, and/or audio applications, and may be implemented as a two-dimensional IFFT for images and/or video applications, for example. The guard interval insertion blocks $216_0 \ldots _{R-1}$ may comprise suitable logic, circuitry, and/or code that may be adapted to insert a guard interval into the contents of the I and Q data streams from the IFFTs $214_0 \ldots _{R-1}$. The time interval inserted by the guard interval insertion blocks $216_0 \ldots _{R-1}$ may be configured by the processor 156, for example. In this regard, the time interval inserted may range between 400 ns and 800 ns, for example. In some instances, pilot and transmission parameter signals (TPS) may be inserted into the I and Q data streams in the R channel signals in the transmit portion 200.

The analog and RF block 218 may comprise suitable logic, circuitry, and/or code that may be adapted to modulate the outputs from the guard interval insertion blocks $216_0 \ldots _{R-1}$ in accordance with the OFDM configuration mode. In this regard, the processor 156 may configure the operating bandwidth of the Analog and RF block 218, for example. The operating bandwidth may range between 20 MHz and 80 Mhz, for example. When the analog and RF block 218 supports spatial multiplexing with single weight diversity, channel weights for generating the spatially multiplexed signals that may be transmitted via at least one of the R transmit antennas 155a (Tx_0), . . . , 155b (Tx_R—1) may be generated by the analog and RF block 218. The Analog and RF block 218 may then transmit weighted signals via the R transmit antennas 155a (Tx_0), . . . , 155b (Tx_R-1). At least some of the operations that correspond to channel weight generation may be controller by the processor 156, for example.

During transmission, the processor 156 may generate at least one signal to program at least some of the transmit portion 200 with a selected OFDM configuration mode. Data to be transmitted may be scrambled by the scrambler 202 and then encoded by the FEC block 204. The parser 206 may generate a plurality of channel signals from the output of the FEC block 204. The interleavers $208_0 \ldots _{R-1}$ may interleave the channel signals and the generated outputs may be transferred to the mappers $210_0 \ldots _{R-1}$. The mappers $210_0 \ldots _{R-1}$ may generate I and Q data streams after mapping the channel signals to the configured constellation. The space-time mapper 212 may receive the outputs of the mappers $210_0 \ldots _{R-1}$ and may transfer those outputs to corresponding IFFTs $214_0 \ldots _{R-1}$ in accordance with the configuration provided by the processor 156, for example.

The IFFTs $214_0 \ldots _{R-1}$ may perform an IFFT operation on the I and Q data streams received from the space-time mapper 212 in accordance with the configured number of transformation points and may transfer the results to the guard interval insertion blocks $216_0 \ldots _{R-1}$. The guard interval insertion blocks $216_0 \ldots _{R-1}$ may insert a configured time interval into the contents of the I and Q data streams and may transfer the results to the analog and RF block 218. The analog and RF block 218 may modulate the signals received from the guard interval insertion blocks $216_0 \ldots _{R-1}$. The analog and RF block 218, when supporting spatially multiplexing with single weight diversity, may generate channel weights that may be utilized to generate a plurality of signals to be transmitted via the R transmit antennas 155a (Tx_0), . . . , 155b (Tx_R-1).

Figure 2B:
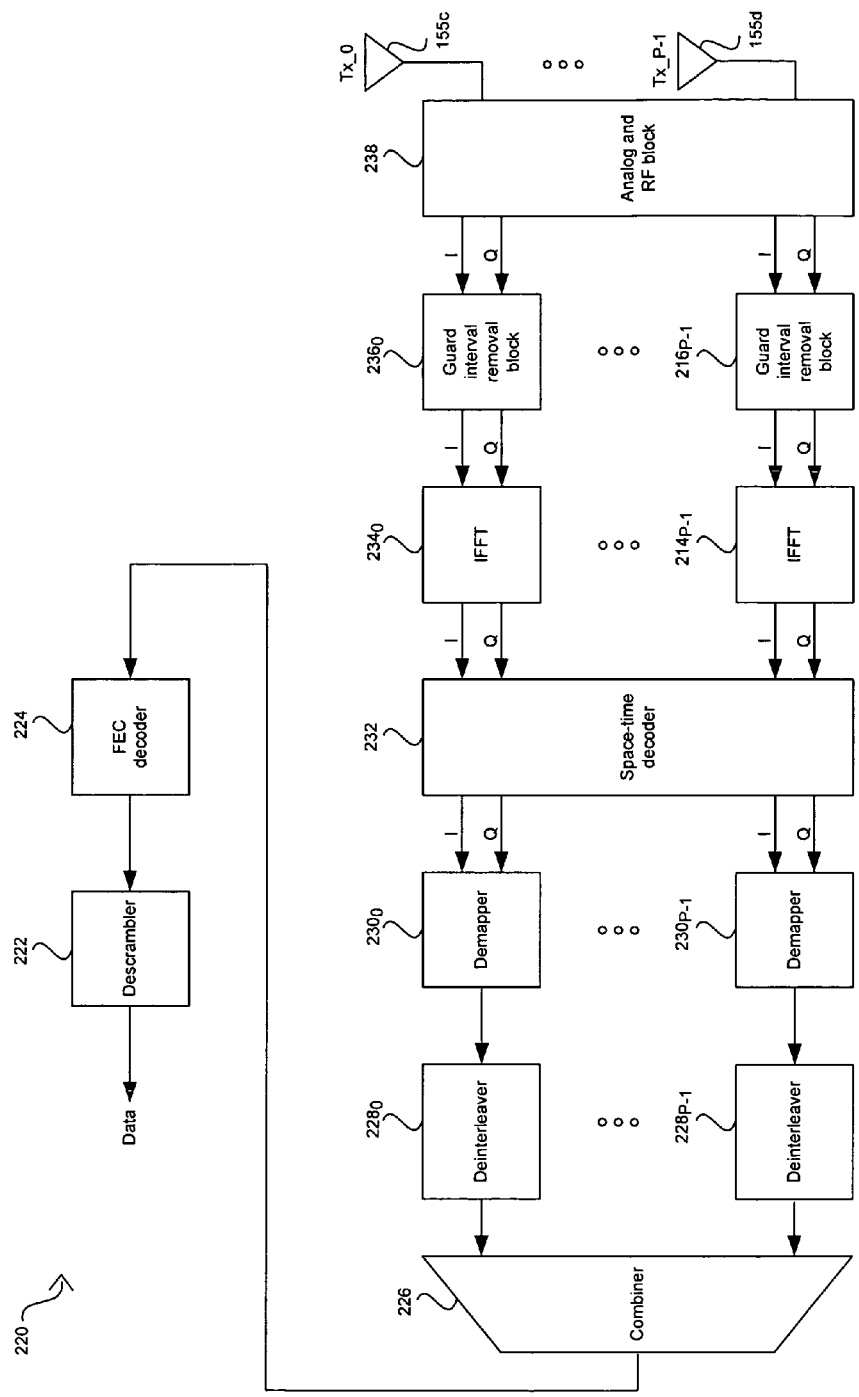
FIG. 2B is a block diagram of the mobile terminal of FIG. 1B illustrating an exemplary receiver portion of a reconfigurable OFDM chip with spatial multiplexing, in accordance with an embodiment of the invention.

FIG. 2B is a block diagram of the mobile terminal of FIG. 1B illustrating an exemplary receiver portion of a reconfigurable OFDM chip with spatial multiplexing, in accordance with an embodiment of the invention. Referring to FIG. 2B, there is shown a receive portion 220 that may be implemented in the OFDM block 154 of the mobile terminal 150 in FIG. 1B. The receive portion 220 may comprise a descrambler 222, an FEC decoder 224, a combiner 226, a plurality of deinterleavers $228_0 \ldots _{P-1}$, a plurality of demappers $230_0 \ldots _{P-1}$, a space-time decoder 232, a plurality of Fast Fourier Transforms (FFTs) $234_0 \ldots _{P-1}$, a plurality of guard interval removal blocks $236_0 \ldots _{P-1}$, and an analog and RF block 238. Moreover, the P receive antennas 155c (Rx_0), . . . , 155d (Rx_P_1) may be coupled to the analog and RF block 238, for example.

The analog and RF block 238 may comprise suitable logic, circuitry, and/or code that may be adapted to demodulate the input signals received via the P receive antennas 155c (Rx_0), . . . , 155d (Rx_P-1). The processor 156 in FIG.1B may configure the operating bandwidth of the analog and RF block 238, for example. The operating bandwidth may range between 20MHz and 80Mhz, for example. When the analog and RF block 238 supports spatial multiplexing with single weight diversity, the Analog and RF block 238 may generate channel weights to be applied to at least one of the P receive antennas 155c (Rx_0), . . . , 155d (Rx_P_1). The analog and RF block 238 may then transfer the I and Q data streams generated from a combination of the weighted received signals to the guard interval removal blocks $236_0 \ldots _{P-1}$. The processor 156 may configure the weight generation in the analog and RF block 238. For example, channel estimation operations for weight generation may be configured in a per-tone estimation basis.

The guard interval removal blocks $236_0 \ldots _{P-1}$ may comprise suitable logic, circuitry, and/or code that may be adapted to remove a guard interval introduced into the contents of the I and Q data streams. The processor 156 may configure the time interval removed by the guard interval removal blocks $236_0 \ldots _{P-1}$, for example. The time interval removed may range between 400 ns and 800 ns and may be selected in accordance with the OFDM configuration mode.

The FFTs $234_0 \ldots _{P-1}$ may comprise suitable logic, circuitry, and/or code that may be adapted to perform an fast Fourier transform operation of the output of the guard interval removal blocks $236_0 \ldots _{P-1}$. In this regard, the number of points to be used by the FFTs $234_0 \ldots _{P-1}$, may be configured by the processor 156 and may be modified in accordance with the OFDM configuration mode selected, for example. The FFTs $234_0 \ldots _{P-1}$, may have a range from 64 points to 8K points, for example. The FFTs $234_0 \ldots _{P-1}$ may be implemented as a one-dimensional FFT for data, text, and/or audio applications, and may be implemented as a two-dimensional FFT for images and/or video applications, for example.

The space-time decoder 232 may be adapted to provide direct or indirect mapping between the outputs of the FFTs $234_0 \ldots _{P-1}$ and the inputs to the demappers $230_0 \ldots _{P-1}$. The processor 156 may configure the mapping operations of the space-time decoder 232, for example. The demappers $230_0 \ldots _{P-1}$, may comprise suitable logic, circuitry, and/or code that may be adapted to reverse the constellation mapping of the I and Q data streams received from the space-time decoder 232 into a single data stream. The demappers $230_0 \ldots _{P-1}$ may be configured by the processor 156 to reverse map QPSK, BPSK, 16-QAM, or 64-QAM signals, for example.

The deinterleavers $228_0 \ldots _{P-1}$, may comprise suitable logic, circuitry, and/or code that may be adapted to decode the interleaved symbols in the data channels. The deinterleavers $228_0 \ldots _{P-1}$ may be adapted to perform, for example, a Viterbi decoding on the outputs of the demappers $230_0 \ldots _{P-1}$. The processor 156, for example, may configure the operations of the deinterleavers $228_0 \ldots _{P-1}$ in accordance with an OFDM configuration mode. The combiner 226 may comprise suitable logic, circuitry, and/or code that may be adapted to combine the P channel signals generated by the deinterleavers $228_0 \ldots _{P-1}$ into a combined data channel that may be transferred to the FEC decoder 224.

The FEC decoder 224 may comprise suitable logic, circuitry, and/or code that may be adapted to decode the combined data channel received from the combiner 226. The FEC decoder 224 may be adapted to perform a Reed-Solomon error correction decoding operation, for example. In this regard, the processor 156 may configure the FEC decoder 224 decoding operations, for example. The descrambler 222 may comprise suitable logic, circuitry, and/or code that may be adapted to process the output of the FEC decoder 224 by utilizing an algorithm that reverses the scrambling provided by a scrambler such as the scrambler 202 in FIG. 2A, for example. In this regard, the descrambler 222 may buffer the output of the FEC decoder 224 when implementing the algorithmic operation. The processor 156 in FIG. 1B may configure the operations of the descrambler 222, for example. In some instances, pilot and transmission parameter signals (TPS) may be removed from the I and Q data streams in the P channel signals in the receive portion 220.

During reception operation, signals may be received by the P receive antennas 155d (Rx_0), . . . , 155d (Rx_P-1). When supporting spatial multiplexing with single weight diversity, the analog and RF block 238 may generate channel weights to modify the received signals. The analog and RF block 238 may generate a plurality of received RF signals by combining the weighted received signals. The analog and RF block 238 may generate I and Q data streams by demodulating the plurality of received RF signals. The guard interval removal blocks $236_0 \ldots _{P-1}$ may remove a configured time interval value from the contents of the I and Q data streams and may transfer the results to the FFTs $234_0 \ldots _{P-1}$. The FFTs $234_0 \ldots _{P-1}$ may perform an FFT operation on the output of the guard interval removal blocks $236_0 \ldots _{P-1}$ in accordance with the configured number of transformation points and may transfer the results to the space-time decoder 232.

The space-time decoder 232 may map the outputs of the FFTs $234_0 \ldots _{P-1}$ to the inputs to the demappers $230_0 \ldots _{P-1}$ in accordance with the configuration provided by the processor 156, for example. Each of the demappers $230_0 \ldots _{P-1}$ may reverse map the I and Q data streams outputs into a single data stream in accordance with the configuration provided. The deinterleavers $228_0 \ldots _{P-1}$ may decode the interleaved symbols in the P channel signals generated by the demappers $230_0 \ldots _{P-1}$. The combiner 226 may combine the decoded channel signals generated by the deinterleavers $228_0 \ldots _{P-1}$ into a combined data channel that may be transferred to the FEC decoder 224. The FEC decoder 224 may decode the combined channel data and the descrambler 222 may descramble the output of the FEC decoder 224 based on an algorithmic operation, for example. The output of the descrambler 22 may correspond to the received data.

U.S. application Ser. No. 11/237,002, filed Sep. 28, 2005, and U.S. application Ser. No. 11/237,045, filed Sep. 28, 2005, provide a detailed description of a configurable OFDM block and are hereby incorporated herein by reference in their entirety.

The configurable portions of the OFDM block 154 in FIG. 1B, such as the transmit portion 200 in FIG. 2A and the receive portion in FIG. 2B, may be programmed via the plurality of registers 157. In this regard, the processor 156 may generate at least one signal to transfer the appropriate values to be utilized by the configurable portions of the OFDM block 154 from the memory 158 to the plurality of registers 157.

Figure 3A:
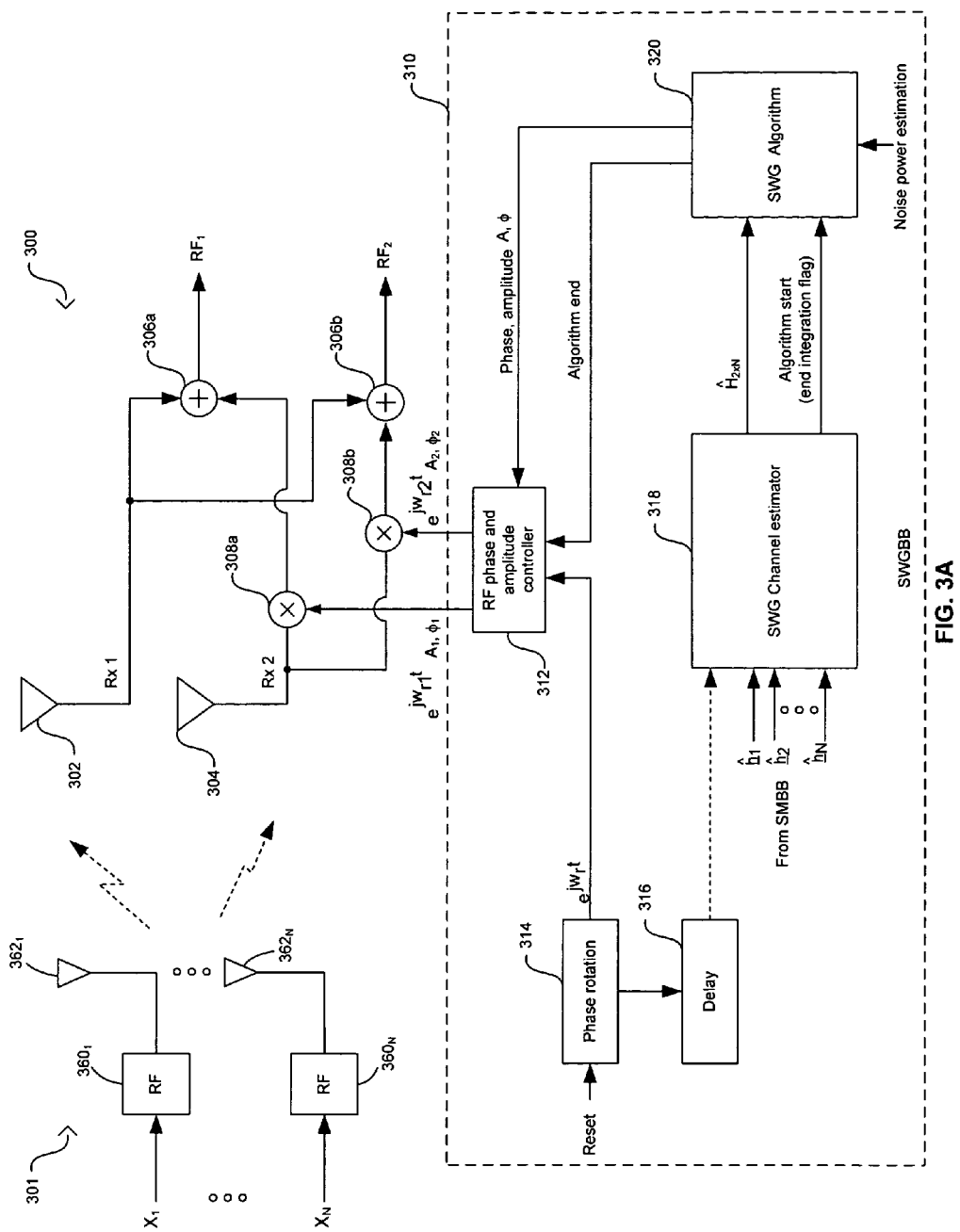
FIG. 3A is a block diagram of an exemplary system for providing phase rotation, channel estimation and for determining optimal phase and amplitude parameters or settings for an additional receive antenna, in accordance with an embodiment of the invention.

FIG. 3A is a block diagram of an exemplary system for providing phase rotation, channel estimation and for determining optimal phase and amplitude parameters or settings for an additional receive antenna, in accordance with an embodiment of the invention. Referring to FIG. 3A, there is shown a transmitter 301 and a receiver system 300. The transmitter 301 may comprise RF blocks $360_1 \ldots _N$ and N transmit antennas $362_1 \ldots _N$. The receiver system 300 may comprise a first receive antenna Rx 1 302, an additional antenna Rx 2 304, combiners 306a and 306b, complex multipliers 308a and 308b, and a single weight generator baseband (SWGBB) processor 310. The SWGBB processor 310 may comprise a phase rotation start controller block 314, a delay block 316, a SWG channel estimator 318, a single weight generator (SWG) algorithm block 320, and a RF phase and amplitude controller 312.

The receive antennas Rx 1 302 and Rx 2 304 may each receive a portion of the transmitted signal. The combiners 306a and 306b may be adapted to combine the received signals into an RF signal $RF_1$ and an RF signal $RF_2$, for example. The complex multipliers 308a and 308b may be adapted to receive a plurality of input signals from the additional receive antenna Rx 2 304 and the RF phase and amplitude controller 312 and to generate signals to the complex multipliers 308a and 308b.

The phase rotation start controller block 314 may comprise suitable logic, circuitry and/or that may be adapted to start after receiving a reset signal and may generate a plurality of output signals to the delay block 316 and the RF phase and amplitude controller 312. The delay block 316 may be adapted to receive an input signal from the phase rotation start controller block 314 and generate a delayed output signal to the SWG channel estimator 318. The SWG channel estimator 318 may comprise suitable logic, circuitry, and/or code that may be adapted to process the received baseband combined channel estimates per transmit antenna $\hat{h}_1 \ldots \hat{h}_N$ from the SMBB processor 126 and may generate a matrix $\hat{H}_{2 \times N}$ of processed estimated channels. The SWG channel estimator 318 may be adapted to generate an algorithm start signal indicating the end of integration that may be utilized by the single weight generator (SWG) algorithm block 320.

The SWG algorithm block 320 may be adapted to receive a plurality of signals from the SWG channel estimator 318, for example, a matrix $\hat{H}_{2 \times N}$ of processed baseband combined channel estimates, an algorithm start signal from the SWG channel estimator 318 and a noise power estimation signal. The SWG algorithm block 320 may generate phase and amplitude correction signals and an algorithm end signal to the RF phase and amplitude controller 312. The RF phase and amplitude controller 312 may be adapted to receive the phase and amplitude values and the algorithm end signal from the SWG algorithm block 320 and generate signals that modify the phase and amplitude of a portion of the transmitted signals received by the receive antenna Rx 2 302.

The SWG channel estimator 318 may receive baseband combined channel estimates $\hat{h}_1 \ldots \hat{h}_N$, which may include all transmission channels from N Tx antennas and each Tx antenna may have a different channel estimation sequence, so that the different combined channels $\hat{h}_1 \ldots \hat{h}_N$ may be separated and estimated. The SWG channel estimator 318 may generate a matrix of channel estimates $\hat{H}_{2 \times N}$ to the SWG algorithm block 320. A reset signal may be utilized to start the phase rotation block 314. The combined channel estimates from the SMBB 426 in FIG. 4 may be transferred to the channel estimator 318 for processing. When processing is complete, the SWG channel estimator 318 may indicate to the SWG algorithm block 320 that the determination of the appropriate phase and amplitude correction for the portion of the received signal in the additional antenna Rx 2 304 may start. The SWG algorithm block 320 may utilize an estimation of the noise power and interference in determining the phase and amplitude values in addition to the matrix of channel estimates $\hat{H}_{2 \times N}$. The SWG algorithm block 320 may indicate to the RF phase and amplitude controller 312 the end of the weight determination operation and may then transfer to the RF phase and amplitude controller 312, the determined phase and amplitude values. The RF phase and amplitude controller 312 may then modify the portion of the received signal in the additional antenna Rx 2 304 via the complex multiplier 308.

In operation, the RF phase and amplitude controller 312 may apply the signals $e^{jw_{r1}t}$ and $e^{jw_{r2}t}$ to the complex multipliers 306a and 306b based on control information provided by the phase rotator start controller 314. The RF phase and amplitude controller 312 may select the rotation waveform source based on the control information provided by the phase rotator start controller 314. Once the channel weights are determined by the SWG algorithm block 320 and the phase and amplitude components have been transferred to the RF phase and amplitude controller 312, the algorithm end signal may be utilized to change the selection in the RF phase and amplitude controller 312. In this regard, the RF phase and amplitude controller 312 may be utilized to select and apply the signals $A_1 e^{j\phi_1}$ and $A_2 e^{j\phi_2}$ to the complex multipliers 308a and 308b in FIG. 3A. At least some of the various portions of the receiver system 300 in FIG. 3A may be implemented in the OFDM block 154 of the mobile terminal 150 in FIG. 1B to support spatial multiplexing with single weight diversity, for example.

Figure 3B:
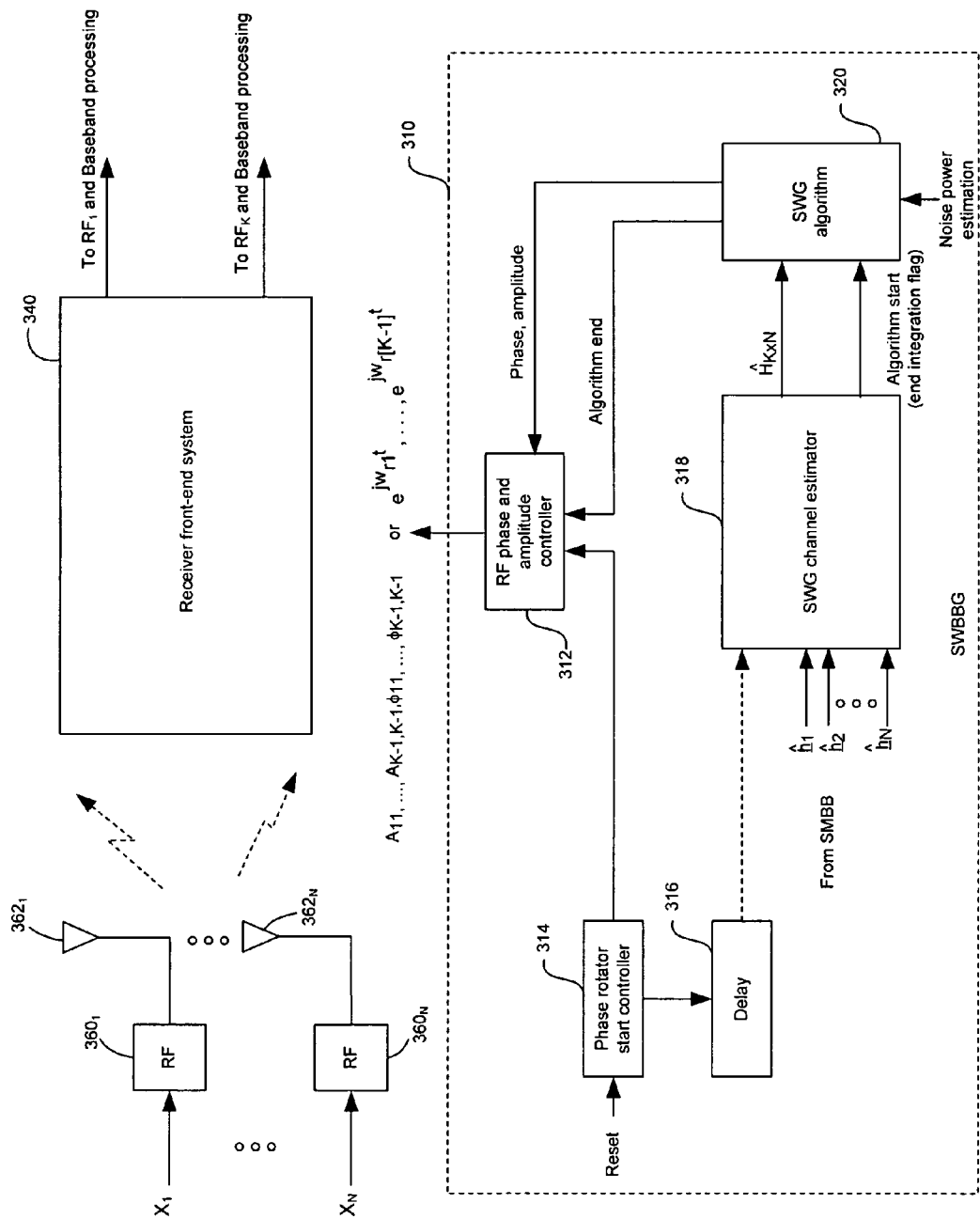
FIG. 3B is a block diagram of an exemplary system for providing phase rotation, channel estimation and for determining optimal phase and amplitude parameters or setting for additional K−1 receive antennas, in accordance with an embodiment of the invention.
Figure 3C:
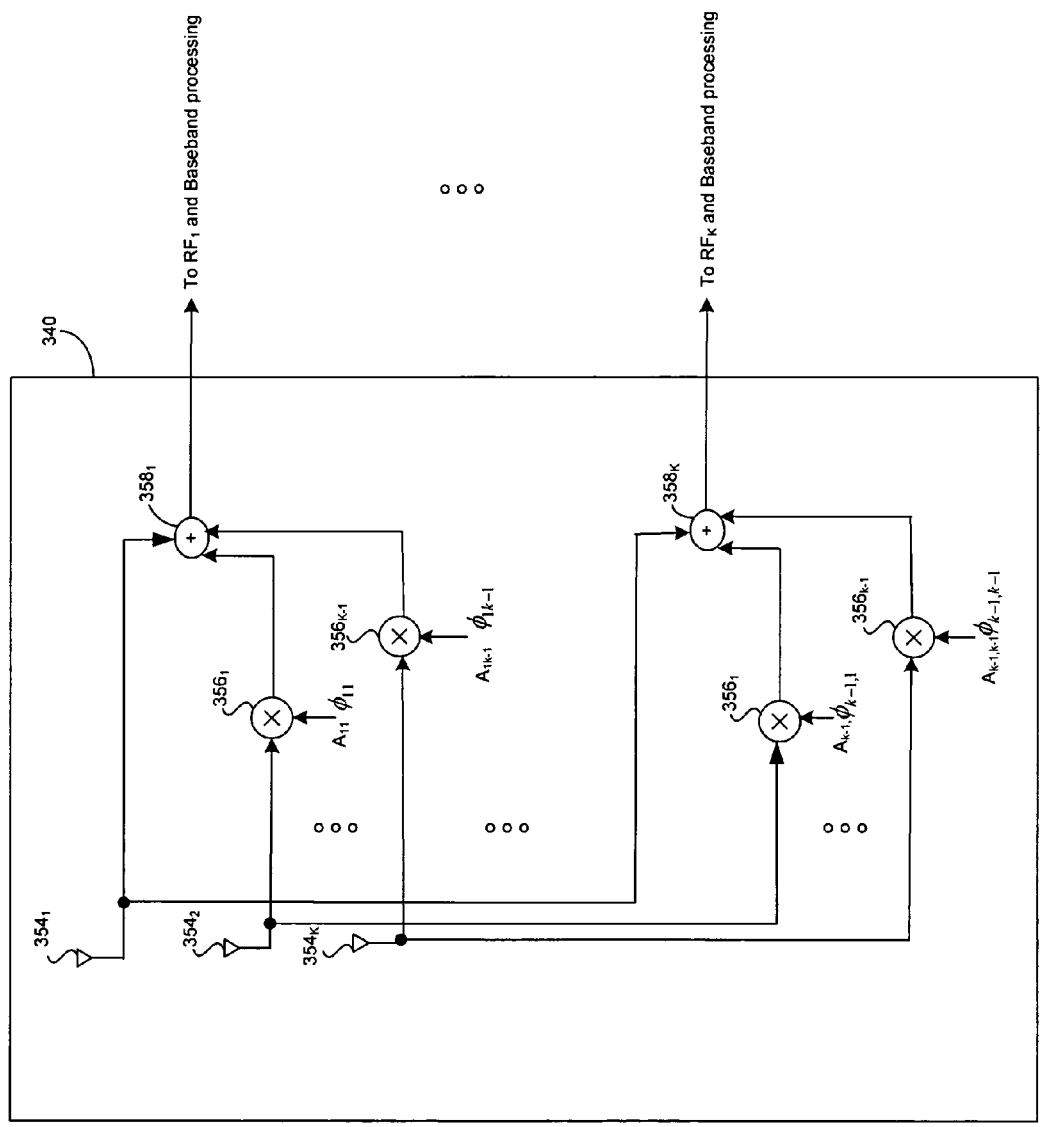
FIG. 3C is a block diagram of an exemplary receiver front-end system that may be utilized in connection with an embodiment of the invention.

FIG. 3B is a block diagram of an exemplary system for providing phase rotation, channel estimation and for determining optimal phase and amplitude parameters or setting for additional K−1 receive antennas, in accordance with an embodiment of the invention. Referring to FIG. 3B, a receiver system 340 may differ from the receiver system 300 in FIG. 3A in that (K−1) additional receive antennas may be utilized. The receiver front-end system 340 may be substantially described as illustrated in FIG. 3C. In this regard, the SWG channel estimator 318 may be adapted to process the combined channel estimates, $\hat{h}_1 \ldots \hat{h}_N$, and determine the propagation channel matrix estimate $\hat{H}_{K \times N}$.

Referring to the FIG. 3B, multiple receive antennas may be connected to each of the RF chains $RF_1 \ldots _K$ as shown in FIG. 3B for the single RF chain $RF_1$. In this regard, the combined channel estimates $\hat{h}_1 \ldots \hat{h}_N$ and consequently the channel estimate matrix $\hat{H}_{K \times N}$ may be determined per each RF chain $RF_1 \ldots RF_K$. Consequently, following this example, N matrices $\hat{H}_{K \times N}$ may form a channel estimate matrix $\hat{H}_{M \times N}$ in FIG. 3B (M=NK).

The SWG algorithm block 320 may also be adapted to determine (K−1) channel weights per RF chain, that may be utilized to maximize receiver SINR, for example, to be applied to a plurality of mixers to modify the portions of the transmitted single channel communication signals received by additional receive antennas. The (K−1) channel weights per RF chain may comprise amplitude and phase components, $A_{11}$ to $A_{K-1,K-1}$ and $\phi_{11}$ to $\phi_{K-1,K-1}$. The RF phase and amplitude controller 312 may also be adapted to apply rotation waveforms $e^{jW_{r1}t}$ to $e^{jW_{r(K-1)}t}$ or phase and amplitude components, $A_{11}$ to $A_{K-1,K-1}$ and $\phi_{11}$ to $\phi_{K-1,K-1}$ to a plurality of mixers. In this regard, the RF phase and amplitude controller 312 may apply the rotation waveforms or the amplitude and phase components in accordance with the control signals provided by the phase rotator start controller 314 and/or the algorithm end signal generated by the SWG algorithm block 320. At least some of the various portions of the receiver system 330 in FIG. 3B may be implemented in the OFDM block 154 of the mobile terminal 150 in FIG. 1B to support spatial multiplexing with single weight diversity, for example.

FIG. 3C is a block diagram of an exemplary receiver system that may be utilized in connection with an embodiment of the invention. Referring to FIG. 3C, there is shown a receiver front-end system 340 as illustrated in FIG. 3B. The receiver front-end system 340 may comprise a plurality of receive antennas $354_1 \ldots _K$, a plurality of mixers $356_1 \ldots _{K-1}$, and a plurality of summers $358_1 \ldots _K$. The plurality of mixers $356_1 \ldots _K$ may be adapted to modify the portions of the transmitted single channel communication signals received by the plurality of receive antennas $354_1 \ldots _K$. The plurality of summers $358_1 \ldots _K$ may combine the received signals into a plurality of RF signals $RF_1 \ldots _K$, for example. The (K−1) channel weights per RF chain may comprise amplitude and phase components, $A_{11}$ to $A_{K-1,K-1}$ and $\phi_{11}$ to $\phi_{K-1,K-1}$.

Figure 4:
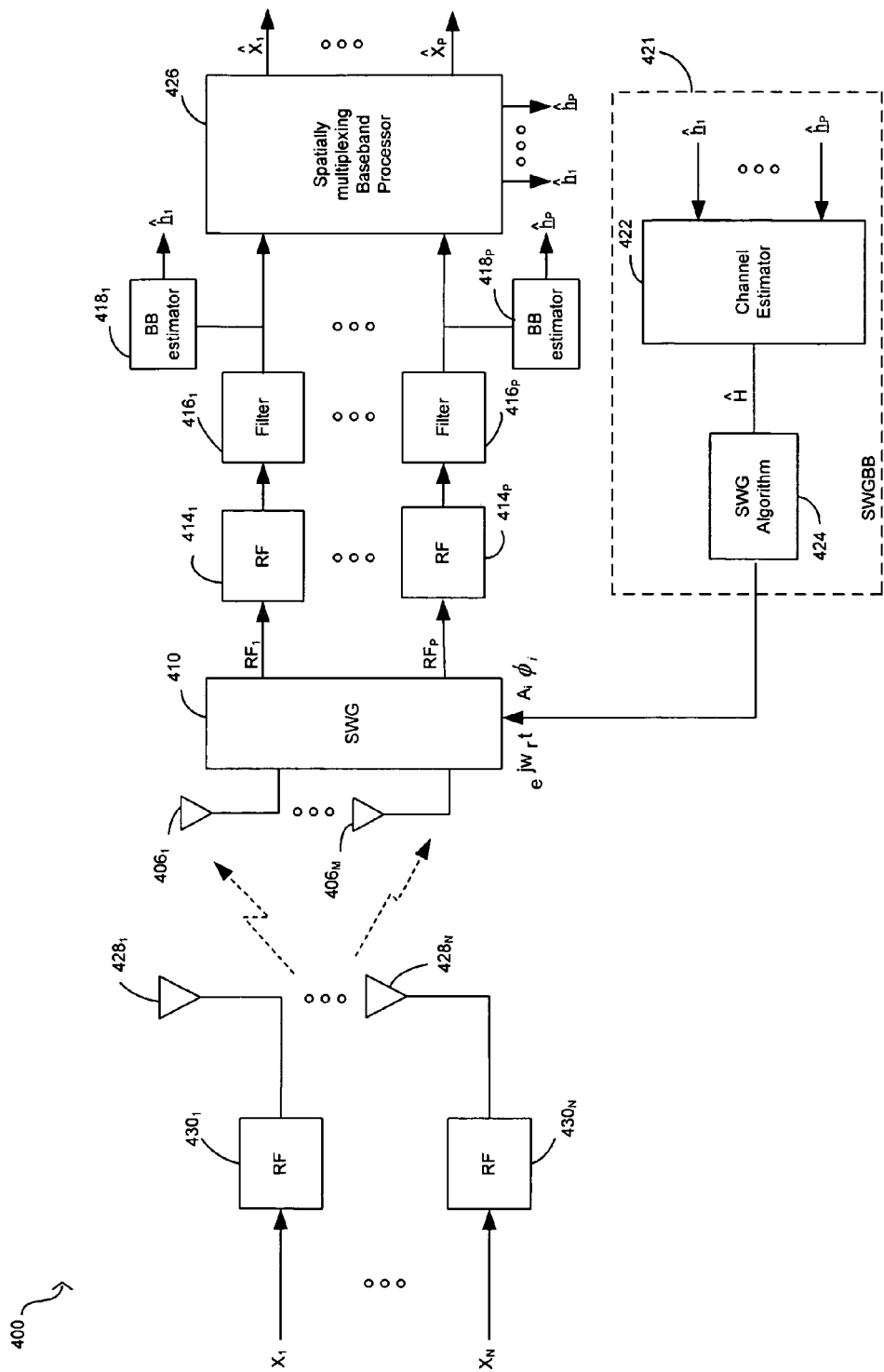
FIG. 4 is a block diagram of an exemplary spatially multiplexed wireless communication system with a N-Tx antenna wireless transmitter and an M-Rx antenna mobile terminal with channel estimation for spatially multiplexed received signals, in accordance with an embodiment of the invention.

FIG. 4 is a block diagram of an exemplary spatially multiplexed wireless communication system with an N-Tx antenna wireless transmitter and an M-Rx antenna mobile terminal with channel estimation for spatially multiplexed received signals, in accordance with an embodiment of the invention. Referring to FIG. 4, the wireless system 400 may comprise a plurality of RF transmit blocks $430_1 \ldots _N$, a plurality of transmit antennas $428_1 \ldots _N$ on that may be implemented in an N-transmit antenna (N-Tx) wireless transmitter. The wireless system 400 may also comprise a plurality of receive antennas $406_1 \ldots _M$, a single weight generator (SWG) 410, a plurality of RF blocks $414_1 \ldots _P$, a plurality of filters $416_1 \ldots _P$, a plurality of baseband (BB) estimators $418_1 \ldots _P$, a spatially multiplexed baseband (SMBB) processor 426 and a single weight generator baseband processor (SWGBB) 421. The SWGBB 421 may comprise a channel estimator 422 and a single weight generator (SWG) algorithm block 424 that may be implemented in an M-receive antenna (M-Rx) mobile terminal with channel estimation for spatially multiplexed received signals.

The RF transmit blocks $430_1 \ldots _N$ may comprise suitable logic, circuitry, and/or code that may be adapted to process an RF signal. The RF transmit blocks $430_1 \ldots _N$ may perform, for example, filtering, amplification, and mixing operations. The plurality of transmit antennas $428_1 \ldots _N$ may transmit the processed RF signals from the plurality of RF transmit blocks $430_1 \ldots _N$ to a plurality of receive antennas $406_1 \ldots _M$, where the number of transmit antennas N may be equal to the number of RF paths N. The plurality of receive antennas $406_1 \ldots _M$ may each receive at least a portion of the transmitted signal. The SWG 410 may comprise suitable logic, circuitry, and/or code that may be adapted to determine a plurality of weights to be applied to each of the input signals $R_{1...M}$. The SWG 410 may be adapted to modify the phase and amplitude of a portion of the transmitted signals received by the plurality of receive antennas $406_{1...M}$ and generate a plurality of output signals $RF_{1...P}$.

The plurality of RF blocks $414_{1...P}$ may comprise suitable logic, circuitry, and/or code that may be adapted to process an RF signal. The RF blocks $414_{1...P}$ may perform, for example, filtering, amplification, and analog-to-digital (A/D) conversion operations. The plurality of transmit antennas 438 and 440 may transmit the processed RF signals to a plurality of receive antennas $406_{1...M}$. The single weight generator SWG 410 may comprise suitable logic, circuitry, and/or code that may be adapted to determine a plurality of weights, which may be applied to each of the input signals. The single weight generator SWG 410 may be adapted to modify the phase and amplitude of at least a portion of the signals received by the plurality of receive antennas $406_{1...M}$ and generate a plurality of output signals $RF_{1...P}$. The plurality of RF receive blocks $414_{1...P}$ may comprise suitable logic, circuitry and/or code that may be adapted to amplify and convert the received analog RF signals $RF_{1...P}$ down to baseband. The plurality of RF receive blocks $414_{1...P}$ may each comprise an analog-to-digital (A/D) converter that may be utilized to digitize the received analog baseband signal.

The plurality of filters $416_{1...P}$ may comprise suitable logic, circuitry and/or code that may be adapted to filter the output of the plurality of RF receive blocks $414_{1...P}$ so as to produce in-phase (I) and quadrature (Q) components (I, Q). The outputs of the plurality of filters $416_{1...P}$ may be transferred to the SMBB processor 426.

The SMBB 426 may be adapted to receive a plurality of in-phase and quadrature components (I, Q) from a plurality of filters $416_{1...P}$ and generate a plurality of baseband combined channel estimates $\hat{h}_1$ to $\hat{h}_P$. The SMBB 426 may be adapted to generate a plurality of estimates $\hat{X}_1$ to $\hat{X}_P$ of the original input spatial multiplexing sub-stream signals or symbols $X_1$ to $X_P$. The SMBB 426 may be adapted to separate the different space-time channels utilizing a Bell Labs Layered Space-Time (BLAST) algorithm, for example, by performing sub-stream detection and sub-stream cancellation. The transmission capacity may be increased almost linearly by utilizing the BLAST algorithm. In another implementation, the BB estimators $418_{1...P}$ may comprise suitable logic, circuitry, and/or code that may be adapted to generate the plurality of baseband combined channel estimates $\hat{h}_1$ to $\hat{h}_P$, for example.

The channel estimator 422 may comprise suitable logic, circuitry, and/or code that may be adapted to process the received estimates $\hat{h}_1$ to $\hat{h}_P$ from the SMBB processor 426 and/or from the BB estimators $418_{1...P}$ and may generate a matrix $\hat{H}$ of processed estimated channels that may be utilized by the single weight generator (SWG) algorithm block 424.

The SWG algorithm block 424 may determine a plurality of amplitude and phase values $A_i$ and $\phi_i$, respectively, which may be utilized by SWG 410 to modify the phase and amplitude of a portion of the transmitted signals received by the plurality of receive antennas $406_{1...M}$ and generate a plurality of output signals $RF_{1...P}$.

Figure 5:
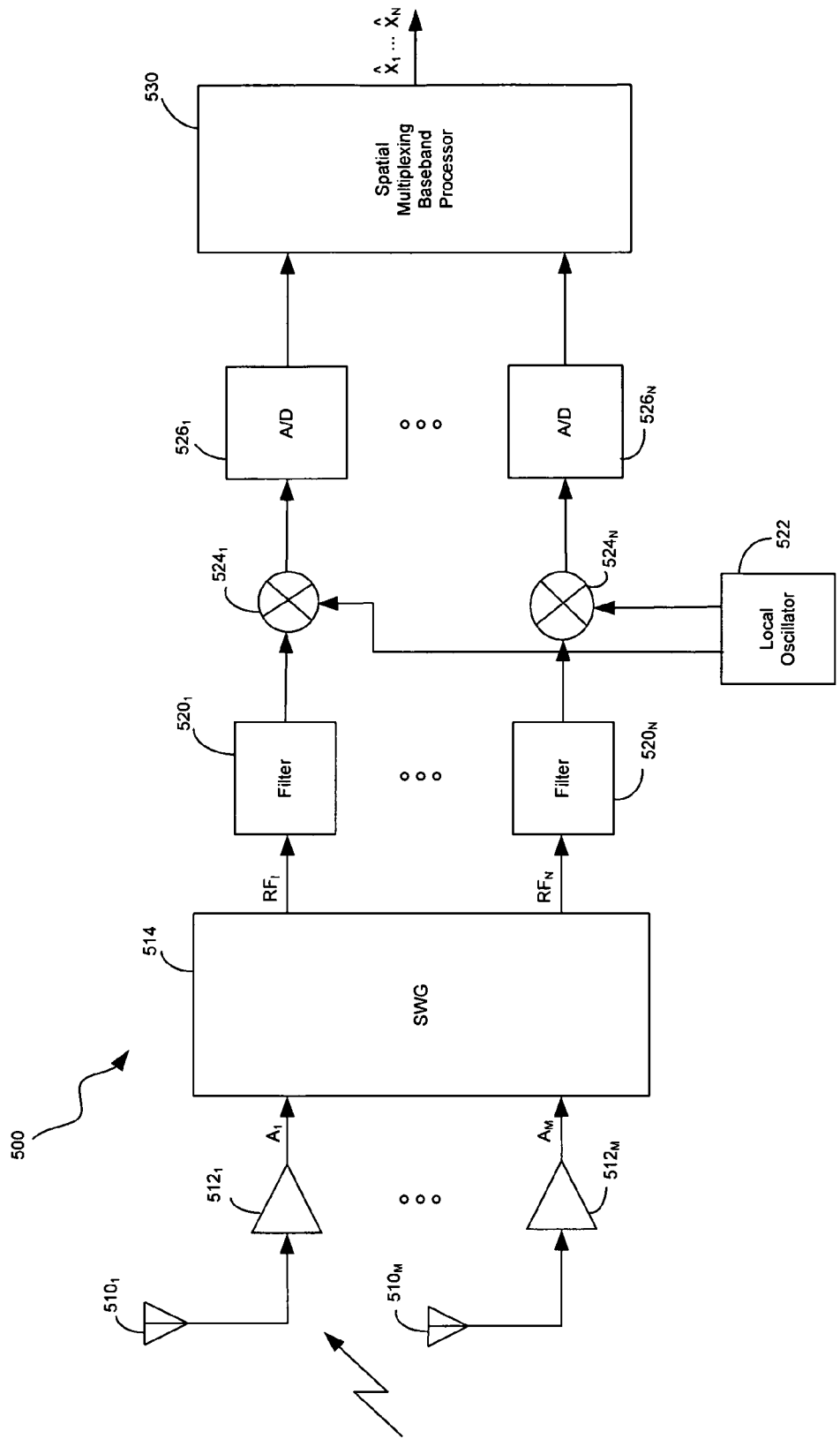
FIG. 5 is a block diagram of an exemplary receiver illustrating spatial multiplexing in a MIMO communication system that may be utilized in connection with an embodiment of the invention.

FIG. 5 is a block diagram of an exemplary receiver illustrating spatial multiplexing in a MIMO communication system that may be utilized in connection with an embodiment of the invention. Referring to FIG. 5, there is shown a receiver 500 that comprises a plurality of receive antennas $510_{1,2,...,M}$, a plurality of amplifiers $512_{1,2,...,M}$, a SWG block 514, a plurality of filters $520_{1,2,...,N}$, a local oscillator 522, a plurality of mixers $524_{1,2,...,N}$, a plurality of analog to digital (A/D) converters $526_{1,2,...,N}$ and a spatial multiplexing baseband processor SMBB 530.

The antennas $510_{1,2,...,M}$ may be adapted to receive the transmitted signals. The amplifiers $512_{1,2,...,M}$ may be adapted to amplify the M received input signals. The SWG block 514 may comprise a plurality of amplitude and phase shifters to compensate for the phase difference between various received input signals. Weights may be applied to each of the input signals $A_{1...M}$ to modify the phase and amplitude of a portion of the transmitted signals received by the plurality of receive antennas $512_{1...M}$ and generate a plurality of output signals $RF_{1...N}$. The plurality of filters $520_{1,2,...,N}$ may be adapted to filter frequency components of the RF substreams. The mixers $524_{1,2,...,N}$ may be adapted to downconvert the analog RF substreams to baseband. The local oscillator 522 may be adapted to provide a signal to the mixers $524_{1,2,...,N}$, which is utilized to downconvert the analog RF substreams to baseband. The analog to digital (A/D) converters $526_{1,2,...,N}$ may be adapted to convert the analog baseband substreams into their corresponding digital substreams. The spatial multiplexing baseband processor SMBB 530 may be adapted to process the digital baseband substreams and multiplex the plurality of digital signals to generate output signals or symbols $\hat{X}_1 ... \hat{X}_N$ which may be estimates of the original spatial multiplexing sub-stream signals or symbols $\hat{X}_1 ... \hat{X}_N$.

In operation, the MT RF signals transmitted by a plurality of transmitters may be received by a plurality of M receive antennas $510_{1,2,...,M}$ deployed at the receiver 500. Each of the M received signals may be amplified by a respective low noise amplifier $512_{1,2,...,M}$. A plurality of weights may be applied to each of the input signals $A_{1...M}$ to modify the phase and amplitude of a portion of the transmitted signals received by the plurality of receive antennas $512_{1...M}$. A plurality of output signals $RF_{1...N}$ may be generated, which may be filtered by a plurality of filters $520_{1,2,...,N}$. The resulting N filtered signals may then be downconverted to baseband utilizing a plurality of N mixers $524_{1,2,...,N}$, each of which may be provided with a carrier signal that may be generated by a local oscillator 522. The N baseband signals generated by the mixers $524_{1,2,...,N}$ may then be converted to digital signals by a plurality of analog to digital (A/D) converters $526_{1,2,...,N}$. The N digital signals may further be processed by a spatial multiplexing baseband processor SMBB 530 to generate an output signals $\hat{X}_1 ... \hat{X}_N$, which are estimates of the original spatial multiplexing sub-stream signals or symbols $X_1 ... X_N$. At least some of the portions of the receiver 500 in FIG. 5 may be implemented in the OFDM block 154 of the mobile terminal 150 in FIG. 1B to support spatial multiplexing with single weight diversity, for example.

In an embodiment of the invention, a single chip, such as the OFDM block 154 of the mobile terminal 150 in FIG. 1B for example, may comprise circuitry that applies at least one of a plurality of channel weights generated within the single chip to at least one of a plurality of spatially multiplexed QPSK modulated signals received via a plurality of antennas in a single OFDM receiver. Circuitry within the single chip may be adapted to combine the spatially multiplexed QPSK modulated signals received via the antennas to generate a plurality of radio frequency (RF) combined received signals. Circuitry within the single chip may also be adapted to determine a plurality of channel estimates based on the RF combined received signals. Circuitry within the single chip may be adapted to determine at least one of a plurality of subsequent channel weights based on the channel estimates. Circuitry within the single chip may be adapted to dynamically update at least a portion of the channel weights. Circuitry within the single chip may also be adapted to determine a phase and amplitude component for the channel weights.

A processor, such as the processor 156 in FIG. 1B for example, may be coupled to the single chip and may be adapted to select an integration time for determining the channel estimates. The processor may also be adapted to configure the single chip in the OFDM receiver to handle at least one of a plurality of communication protocols based on OFDM. These OFDM-based communication protocols may be IEEE 802.11 wireless local area network (WLAN) protocol, an IEEE 802.16 wireless metropolitan area network (WMAN) protocol, or a digital video broadcasting (DVB) protocol, for example. The processor may be adapted to generate at least one signal that controls the dynamic update of the channel weights.

Another embodiment of the invention may provide a machine-readable storage, having stored thereon, a computer program having at least one code section executable by a machine, thereby causing the machine to perform the steps as described above for increasing data rate in a mobile terminal using spatial multiplexing.

The use of QPSK modulated spatially multiplexed MIMO systems that utilize mobile terminals comprising a single configurable OFDM chip may enable delivery of high data rates in DVB-H communications that provide acceptable performance to high Doppler effects.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for handling wireless communication, the method comprising:
applying, within a single chip, at least one of a plurality of channel weights generated within said single chip to at least one of a plurality of spatially multiplexed quadrature phase shift keying (QPSK) modulated signals received via a plurality of antennas in a single orthogonal frequency division multiplexing (OFDM) receiver;
combining said plurality of spatially multiplexed QPSK modulated signals received via said plurality of antennas to generate a plurality of radio frequency (RF) combined received signals;
determining a plurality of channel estimates based on said generated plurality of RF combined received signals; and
determining at least one of a plurality of subsequent channel weights based on said determined plurality of channel estimates.

2. The method according to claim 1, comprising selecting an integration time for determining said plurality of channel estimates.

3. The method according to claim 1, comprising configuring said single chip in said OFDM receiver to handle at least one of a plurality of communication protocols based on OFDM.

4. The method according to claim 3, wherein said at least one of said plurality of communication protocols based on OFDM is an IEEE 802.11 wireless local area network (WLAN) protocol, an IEEE 802.16 wireless metropolitan area network (WMAN) protocol, or a digital video broadcasting (DVB) protocol.

5. The method according to claim 1, comprising updating at least a portion of said at least one of said plurality of channel weights dynamically.

6. The method according to claim 5, comprising generating at least one signal that controls said dynamic update of said at least one of a plurality of channel weights.

7. The method according to claim 1, comprising determining a phase and amplitude component for said at least one of said plurality of channel weights.

8. A system for handling wireless communication, the system comprising:
one or more circuits within a single chip that are operable to apply at least one of a plurality of channel weights generated within said single chip to at least one of a plurality of spatially multiplexed quadrature phase shift keying (QPSK) modulated signals received via a plurality of antennas in a single orthogonal frequency division multiplexing (OFDM) receiver;
said one or more circuits within said single chip are operable to combine said plurality of spatially multiplexed QPSK modulated signals received via said plurality of antennas to generate a plurality of radio frequency (RF) combined received signals;
said one or more circuits within said single chip are operable to determine a plurality of channel estimates based on said generated plurality of RF combined received signals; and
said one or more circuits within said single chip are operable to determine at least one of a plurality of subsequent channel weights based on said determined plurality of channel estimates.

9. The system according to claim 8, comprising a processor coupled to said single chip, wherein said processor is operable to select an integration time for determining said plurality of channel estimates.

10. The system according to claim 8, comprising a processor coupled to said single chip, wherein said processor is operable to configure said single chip in said OFDM receiver to handle at least one of a plurality of communication protocols based on OFDM.

11. The system according to claim 10, wherein said at least one of said plurality of communication protocols based on OFDM is an IEEE 802.11 wireless local area network (WLAN) protocol, an IEEE 802.16 wireless metropolitan area network (WMAN) protocol, or a digital video broadcasting (DVB) protocol.

13. The system according to claim 8, wherein said one or more circuits within said single chip are operable to update at least a portion of said at least one of said plurality of channel weights dynamically.

13. The system according to claim 12, comprising a processor coupled to said single chip that is operable to generate at least one signal that controls said dynamic update of said at least one of a plurality of channel weights.

14. The system according to claim 8, wherein said one or more circuits within said single chip are operable to determine a phase and amplitude component for said at least one of said plurality of channel weights.

* * * * *

UNITED STATES PATENT AND TRADEMARK OFFICE
CERTIFICATE OF CORRECTION

PATENT NO. : 7,653,415 B2 Page 1 of 1
APPLICATION NO. : 11/237329
DATED : January 26, 2010
INVENTOR(S) : Pieter van Rooyen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 989 days.

Signed and Sealed this

Twenty-third Day of November, 2010

David J. Kappos
*Director of the United States Patent and Trademark Office*